United States Patent
Yoon et al.

(10) Patent No.: US 12,238,515 B2
(45) Date of Patent: Feb. 25, 2025

(54) APPARATUS AND METHOD FOR SSP DEVICE AND SERVER TO NEGOTIATE DIGITAL CERTIFICATES

(71) Applicant: Samsung Electronics Co., Ltd., Suwon-si (KR)

(72) Inventors: Kangjin Yoon, Suwon-si (KR); Duckey Lee, Suwon-si (KR); Hyewon Lee, Suwon-si (KR); Jonghoe Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/544,179

(22) Filed: Dec. 18, 2023

(65) Prior Publication Data

US 2024/0121603 A1 Apr. 11, 2024

Related U.S. Application Data

(63) Continuation of application No. 17/503,155, filed on Oct. 15, 2021, now Pat. No. 11,849,317, which is a (Continued)

(30) Foreign Application Priority Data

Sep. 7, 2018 (KR) .......................... 10-2018-0107384

(51) Int. Cl.
*H04L 29/06* (2006.01)
*H04L 9/08* (2006.01)
(Continued)

(52) U.S. Cl.
CPC ....... *H04W 12/0431* (2021.01); *H04L 9/0844* (2013.01); *H04L 9/3265* (2013.01);
(Continued)

(58) Field of Classification Search
CPC . H04W 12/0431; H04W 12/06; H04W 72/10; H04W 28/18; H04W 12/03;
(Continued)

(56) References Cited

U.S. PATENT DOCUMENTS 9,009,475 B2 4/2015 Hauck et al.
11,153,752 B2 * 10/2021 Yoon ..................... H04W 72/56
(Continued)

FOREIGN PATENT DOCUMENTS

CN 1859097 A 11/2006
CN 107070657 A 8/2017
(Continued)

OTHER PUBLICATIONS

Notification of Transmittal of the International Search Report and the Written Opinion of the International Searching Authority, or the Declaration dated Dec. 19, 2019 in connection with International Patent Application No. PCT/KR2019/011613, 10 pages.
(Continued)

*Primary Examiner* — Mahfuzur Rahman

(57) ABSTRACT

A method of a local bundle assistant (LBA) negotiating a certificate with a secondary platform bundle manager (SPBM) in a wireless communication system including: transmitting a request message requesting information of certificates supported by a secondary secure platform (SSP) to a secondary platform bundle loader (SPBL) of the SSP; receiving the information of certificates supported by the SSP including information of certificate issuers corresponding to a family identifier from the SPBL; transmitting the information of certificates supported by the SSP to the SPBM; and receiving a certificate of the SPBM for key agreement, information of public key identifiers of certificate issuers to be used by the SSP, and information of the family identifier from the SPBM.

20 Claims, 10 Drawing Sheets

Related U.S. Application Data continuation of application No. 16/565,389, filed on Sep. 9, 2019, now Pat. No. 11,153,752.

(51) Int. Cl.
| | | |
|---|---|---|
| *H04L 9/32* | (2006.01) | |
| *H04L 9/40* | (2022.01) | |
| *H04W 12/0431* | (2021.01) | |
| *H04W 12/06* | (2021.01) | |
| *H04W 28/18* | (2009.01) | |
| *H04W 72/56* | (2023.01) | |
| *H04L 9/00* | (2022.01) | |
| *H04L 67/01* | (2022.01) | |

(52) U.S. Cl.
CPC .......... *H04L 9/3268* (2013.01); *H04L 63/166* (2013.01); *H04W 12/06* (2013.01); *H04W 28/18* (2013.01); *H04W 72/56* (2023.01); *H04L 9/50* (2022.05); *H04L 67/01* (2022.05)

(58) Field of Classification Search
CPC .. H04W 12/069; H04L 9/3265; H04L 9/3268; H04L 63/166; H04L 9/0844; H04L 67/42; H04L 2209/38; H04L 63/205
See application file for complete search history.

(56) References Cited

U.S. PATENT DOCUMENTS

| | | | | |
|---|---|---|---|---|
| 2003/0163687 | A1* | 8/2003 | Dare | H04L 9/3265 713/157 |
| 2011/0010543 | A1* | 1/2011 | Schmidt | H04L 63/123 713/168 |
| 2011/0289178 | A1* | 11/2011 | Ittah | G06F 21/79 711/138 |
| 2012/0290830 | A1* | 11/2012 | Resch | H04L 9/3093 713/150 |
| 2014/0359604 | A1 | 12/2014 | Salameh et al. | |
| 2015/0017950 | A1* | 1/2015 | Zhao | H04W 12/06 455/411 |
| 2015/0178495 | A1 | 6/2015 | Sheehan et al. | |
| 2017/0214662 | A1 | 7/2017 | Chu et al. | |
| 2017/0295025 | A1* | 10/2017 | Meriac | H04L 63/0823 |
| 2018/0019993 | A1* | 1/2018 | Kravitz | G06F 21/645 |
| 2018/0123803 | A1* | 5/2018 | Park | H04W 12/06 |
| 2019/0253884 | A1 | 8/2019 | Fan et al. | |
| 2019/0327605 | A1 | 10/2019 | Fan et al. | |
| 2020/0244470 | A1* | 7/2020 | Ruckriemen | H04L 63/12 |
| 2022/0038894 | A1* | 2/2022 | Yoon | H04L 9/3268 |

FOREIGN PATENT DOCUMENTS

| | | |
|---|---|---|
| CN | 107873137 A | 4/2018 |
| CN | 108353278 A | 7/2018 |
| KR | 10-2019-0004499 A | 1/2019 |
| WO | 2017147873 A1 | 9/2017 |
| WO | 2018072177 A1 | 4/2018 |

OTHER PUBLICATIONS

Supplementary European Search Report issued Jun. 22, 2021, in connection with European Patent Application No. 19857430.3, 8 pages.
TS 104 365 rapporteur, "V.1.3.0 of TS 103 465 Smart Secure Platform," ETSI TC SCP Meeting #85 Tdoc SCP(18) 000213, Paris, France, Sep. 20-21, 2018, 43 pages.
Office Action dated Dec. 19, 2022 in connection with India Patent Application No. 202137010851, 7 pages.
Communication under Rule 71(3) EPC dated Jul. 18, 2023, in connection with European Patent Application No. 19857430.3, 127 pages.
Notification of the Decision to Grant dated Jan. 4, 2024, in connection with Chinese Patent Application No. 201980073371.3, 8 pages.
European Search Report dated Feb. 21, 2024, in connection with European Patent Application No. 23213721.6, 14 pages.
Hearing Notice dated Mar. 19, 2024, in connection with Indian Patent Application No. 202137010851, 3 pages.
ETSI TS 103 465 V1.3.0 (Jun. 2018), Smart Cards; Smart Secure Platform (SSP); Requirements Specification Jun. 2018, 43 pages.
SCP TEC, "Additional features for the SPB loader," SCPTEC(18)000232r5, ETSI TC SCP TEC Meeting #75, San Diego, CA Jun. 18-22, 2018, 4 pages.
Globalplatform, "GlobalPlatform Card Technology, Open Firmware Loader for Tamper Resistant Element," Version 1.3, Jun. 2017, GPC_FST_134, 81 pages.

* cited by examiner

APPARATUS AND METHOD FOR SSP DEVICE AND SERVER TO NEGOTIATE DIGITAL CERTIFICATES

CROSS-REFERENCE TO RELATED APPLICATION

This application is a continuation of application Ser. No. 17/503,155, filed Oct. 15, 2021, now U.S. Pat. No. 11,849,317, which is a continuation of application Ser. No. 16/565,389, filed Sep. 9, 2019, now U.S. Pat. No. 11,153,752, which is based on and claims priority under 35 U.S.C. § 119 to Korean Patent Application No. 10-2018-0107384, filed on Sep. 7, 2018, in the Korean Intellectual Property Office, the disclosures of which are incorporated by reference herein in their entirety.

BACKGROUND

1. Field

The disclosure relates to a method and apparatus for selecting and managing valid certificates and certificate issuer information that may be used when a terminal downloads a bundle from a server and installs the bundle.

2. Description of the Related Art

In order to meet the increasing demand with respect to wireless data traffic because the commercialization of 4G communication systems, efforts have been made to develop improved 5G communication systems or pre-5G communication systems. For this reason, 5G communication systems or pre-5G communication systems are called Beyond 4G network communication systems or Post LTE systems. In order to achieve a high data transmission rate, consideration is given to implementing 5G communication systems in millimeter wave (mmW) frequency bands (e.g., 60 GHz bands). In order to reduce propagation path loss and increase a propagation distance in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (COMP), and interference cancellation are underway. Furthermore, in 5G communication systems, developments of an advanced coding modulation (ACM) scheme such as hybrid FSK and QAM modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied. In IoT environments, an intelligent Internet Technology (IT) service for collecting and analyzing data generated by connected things and creating a new value in people's lives may be provided. IoT is applicable to various fields, such as smart home, smart building, smart city, smart car or connected car, smart grid, health care, smart home appliances, and advanced medical care, via convergence and combination of existing information technology (IT) with various industries.

Accordingly, various attempts are made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered as an example of convergence of 5G technology and IoT technology.

Because mobile communication systems may provide various services due to the development of the above mobile communication systems, methods of effectively providing the services are required.

SUMMARY

Provided are an apparatus and method capable of remotely installing a control module in a security module installed in an electronic device and providing a security service through the control module and security information stored in the security module.

Additional aspects will be set forth in part in the description which follows and, in part, will be apparent from the description, or may be learned by practice of the presented embodiments of the disclosure.

According to an embodiment of the disclosure, a method of a local bundle assistant (LBA) negotiating a certificate with a secondary platform bundle manager (SPBM) in a wireless communication system includes: transmitting a request message requesting information of certificates supported by a secondary secure platform (SSP) to a secondary platform bundle loader (SPBL) of the SSP; receiving the information of certificates supported by the SSP including information of certificate issuers corresponding to a family identifier from the SPBL; transmitting the information of certificates supported by the SSP to the SPBM; and receiving a certificate of the SPBM for key agreement, information of public key identifiers of certificate issuers to be used by the SSP, and information of the family identifier from the SPBM, wherein, the information of certificate issuers corresponding to a family identifier includes information of public key identifiers of certificate issuers that issued certificates included in a certificate chain of the SPBM and are verifiable by the SPBL, information of public key identifiers of certificate issuers that issued certificates included in a certificate chain of the SPBL and are verifiable by the SPBM, and the information of the family identifier.

According to another embodiment of the disclosure, a method of a secondary platform bundle manager (SPBM) negotiating a certificate with a local bundle assistant (LBA) in a wireless communication system includes: receiving information of certificates supported by a secondary secure platform (SSP) including information of certificate issuers corresponding to a family identifier from the LBA; and transmitting a certificate of the SPBM for key agreement, information of public key identifiers of certificate issuers to be used by the SSP, and information of the family identifier to the LBA, wherein, the information of certificate issuers corresponding to a family identifier includes information of public key identifiers of certificate issuers that issued certificates included in a certificate chain of the SPBM and are verifiable by the SPBL, information of public key identifiers of certificate issuers that issued certificates included in a certificate chain of the SPBL and are verifiable by the SPBM, and the information of the family identifier.

According to another embodiment of the disclosure, a local bundle assistant (LBA) negotiating a certificate with a secondary platform bundle manager (SPBM) in a wireless communication system includes: a transceiver; and at least one controller coupled with the transceiver, the at least one controller configured to: transmit a request message requesting information of certificates supported by a secondary secure platform (SSP) to a secondary platform bundle loader (SPBL) of the SSP; receive the information of certificates supported by the SSP including information of certificate issuers corresponding to a family identifier from the SPBL; transmit the information of certificates supported by the SSP to the SPBM; and receive a certificate of the SPBM for key agreement, information of public key identifiers of certificate issuers to be used by the SSP, and information of the family identifier from the SPBM, wherein, the information of certificate issuers corresponding to a family identifier includes information of public key identifiers of certificate issuers that issued certificates included in a certificate chain of the SPBM and are verifiable by the SPBL, information of public key identifiers of certificate issuers that issued certificates included in a certificate chain of the SPBL and are verifiable by the SPBM, and the information of the family identifier.

According to another embodiment of the disclosure, a secondary platform bundle manager (SPBM) negotiating a certificate with a local bundle assistant (LBA) in a wireless communication system includes: a transceiver; and at least one controller coupled with the transceiver, the at least one controller configured to: receive information of certificates supported by a secondary secure platform (SSP) including information of certificate issuers corresponding to a family identifier from the LBA; and transmit a certificate of the SPBM for key agreement, information of public key identifiers of certificate issuers to be used by the SSP, and information of the family identifier to the LBA, wherein, the information of certificate issuers corresponding to a family identifier includes information of public key identifiers of certificate issuers that issued certificates included in a certificate chain of the SPBM and are verifiable by the SPBL, information of public key identifiers of certificate issuers that issued certificates included in a certificate chain of the SPBL and are verifiable by the SPBM, and the information of the family identifier.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
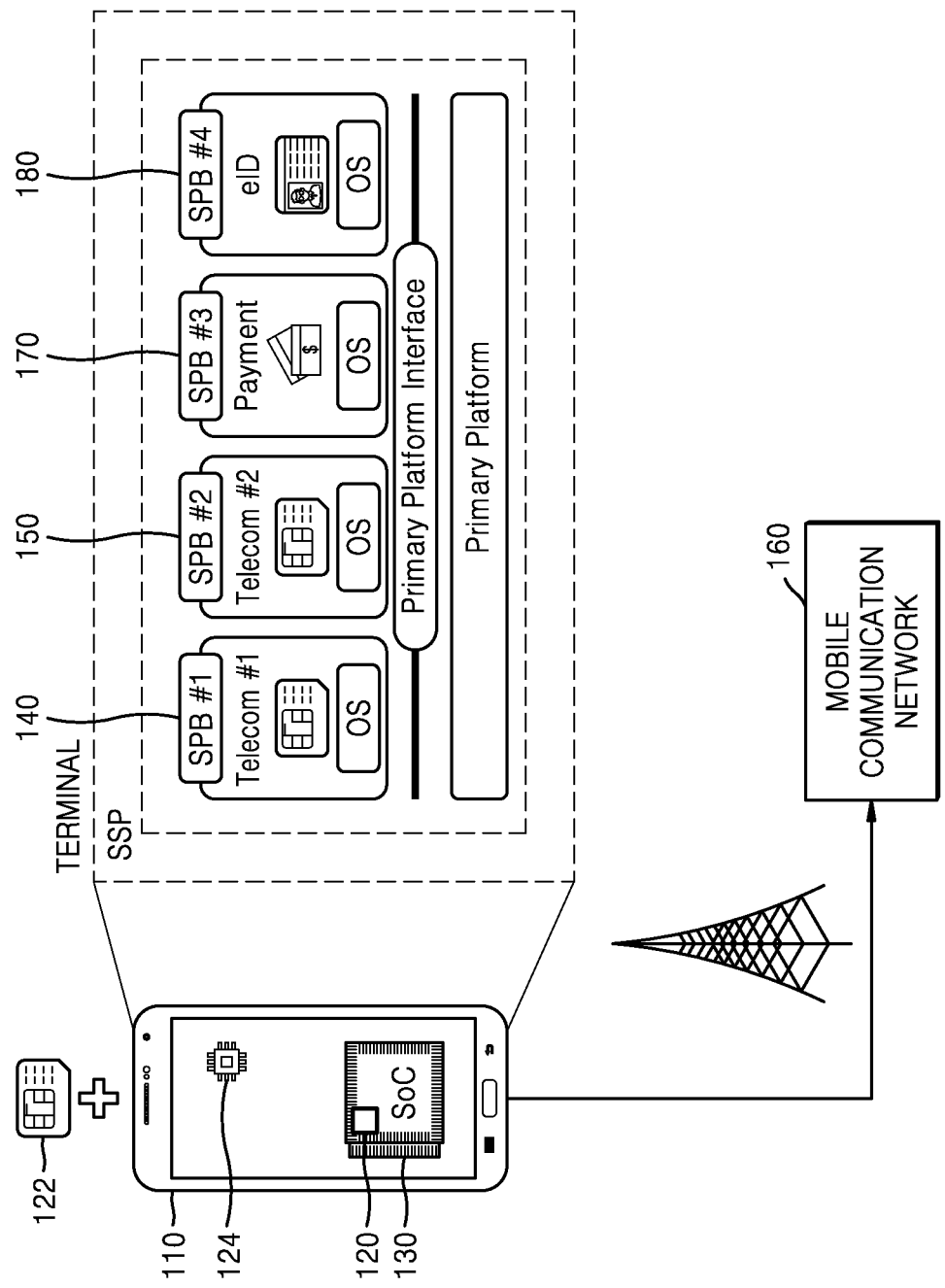
FIG. 1 illustrates a diagram of a mobile communication network connection method of a terminal using a smart secure platform (SSP) in which telecom bundles including profiles are mounted, according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described more fully with reference to the accompanying drawings.

In the following description of embodiments of the disclosure, descriptions of techniques that are well known in the art and not directly related to the disclosure are omitted. This is to clearly convey the gist of the disclosure by omitting any unnecessary explanation.

For the same reason, some elements in the drawings are exaggerated, omitted, or schematically illustrated. Also, actual sizes of respective elements are not necessarily represented in the drawings. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. The scope of the disclosure only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s).

These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit", as used herein, may refer to a software or hardware component such as a field programmable gate array (FPGA) or an application specific integrated circuit (ASIC), which performs certain tasks. However, the term "unit" is not limited to software or hardware, but may be configured to reside on an addressable storage medium and configured to execute one or more processors. Thus, the term 'unit' or '~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers(ors)' may be implemented to operate one or more central processing units (CPUs) in a device or a secure multimedia card.

Throughout the disclosure, the expression "at least one of a, b or c" indicates only a, only b, only c, both a and b, both a and c, both b and c, all of a, b, and c, or variations thereof.

Specific terms used in the following description are provided to help with understanding the disclosure, and the use of such specific terms may be changed into other forms without departing from the technical spirit of the disclosure.

Secure element (SE) is a security module that stores security information (e.g., a mobile communication network access key, user identification information such as an identification card/passport, credit card information, and an encryption key) and is configured of a single chip capable of including and operating a control module (e.g., a network access control module such as a universal subscriber identity module (USIM), an encryption module, or a key generation module). The SE may be used in a variety of electronic apparatuses (e.g., smartphones, tablets, wearable devices, automobiles, and IoT devices), and may provide security services (e.g., mobile communication network connection, payment, and user authentication) via the security information and the control module.

The SE may be classified into a universal integrated circuit card (UICC), an embedded secure element (eSE), and a smart secure platform (SSP), which is an integration of a UICC and an eSE. The SE may also be classified into a removable type, an embedded type, and an integrated type integrated into a specific device or a system on chip (SoC) according to forms in which the SE is connected to or installed in electronic apparatuses.

The UICC refers to a smart card inserted into and used in a mobile communication terminal or the like. The UICC may include a connection control module for accessing the network of a mobile network operator. Examples of the connection control module include a USIM, a subscriber identity module (SIM), and IP multimedia service identity module (ISIM). A UICC including a USIM is generally referred to as a USIM card. Likewise, a UICC including a SIM is generally referred to as a SIM card. A SIM may be mounted when a UICC is manufactured, or a SIM of a mobile communication service that a user desires to use at the desired time may be downloaded to a UICC. A UICC may also download and install a plurality of SIMs, and may select and use at least one from the plurality of SIMs. Such a UICC may or may not be fixed to a terminal. A UICC fixed to and used in a terminal is referred to as an embedded UICC (eUICC). In particular, a UICC embedded in an SoC including a communication processor, an application processor, or a single processor which is an integration of the above two processors may also be referred to as an integrated UICC (iUICC). Typically, an eUICC and an iUICC may refer to a UICC which may be fixed to and used in a terminal and remotely download and select a SIM module. In the disclosure, a UICC card that can download and select a SIM remotely is referred to as an eUICC or an iUICC. In other words, a UICC card fixed to or not fixed to a terminal from among UICC cards capable of remotely downloading and selecting a SIM module is referred to as an eUICC or an iUICC. Further, downloaded SIM module information is referred to as an eUICC or iUICC profile or, more briefly, a profile.

An embedded secure element (eSE) refers to an embedded SE that is fixed to an electronic apparatus and used therein. The eSE is typically manufactured for manufacturers only at the request of a terminal manufacturer, and may be manufactured to include an operating system and a framework. The eSE may download and install an applet-type service control module remotely and may be used for various security services such as an electronic wallet, ticketing, an electronic passport, and a digital key. In the disclosure, an SE in the form of a single chip attached to an electronic apparatus, the SE capable of downloading and installing a service control module remotely is referred to as an eSE.

Smart secure platforms (SSPs) are able to integrally support the functions of an UICC and an eSE in a single chip, and may be classified into a removable SSP (rSSP), an embedded SSP (eSSP), and an integrated SSP (iSSP) embedded in an SoC. An SSP may include one primary platform (PP) and at least one secondary platform bundle (SPB) that operates on the PP. The primary platform may include at least one of a hardware platform or a low-level operating system (LLOS), and the secondary platform bundle may include at least one of a high-level operating system (HLOS) or an application that runs on the HLOS. The secondary platform bundle may also be referred to as an SPB or a bundle. The bundle may access resources such as a central processing unit, memory, and the like of the PP through a primary platform interface (PPI) provided by the PP, and accordingly may be operated on the PP. The bundle may include a communication application such as a SIM, a USIM, or an ISIM, and may also include various applications such as an electronic wallet, ticketing, an electronic passport, and a digital key.

The SSP may be used for the above-described UICC or eSE according to bundles downloaded and installed remotely, and may be interchangeably used for the UICC and the eSE by installing a plurality of bundles in a single SSP and simultaneously operating the plurality of bundles. In other words, when a bundle including a profile operates in an SSP, the SSP may be used for UICCs to connect to the network of a mobile operator. The corresponding UICC bundle may operate by remotely downloading at least one profile into the bundle and select and operate one of the remotely-downloaded at least one profile, as in an eUICC or iUICC. In addition, when a bundle including a service control module equipped with an application capable of providing a service such as an electronic wallet, ticketing, an electronic passport, or a digital key on an SSP operates in the SSP, the SSP may be used for eSEs. A plurality of service control modules may be integrally installed and operated in one bundle or may be installed and operated in independent bundles.

Hereinafter, terms used in the specification will be described in more detail.

The term "SSP", as used herein, is a chip-type security module that is able to integrally support the functions of an UICC and an eSE in a single chip and may be classified into a removable SSP (rSSP), an embedded SSP (eSSP), or an integrated SSP (iSSP) embedded in an SoC. An SSP may download and install a bundle from an external bundle management server (e.g., a secondary platform bundle (SPB) manager) by using over-the-air (OTA) technology.

In the disclosure, a method of downloading and installing a bundle by using an OTA technology in an SSP is equally applicable to removable SSPs (rSSPs) detachably inserted into terminals, embedded SSPs (eSSPs) installed in terminals, and integrated SSPs (iSSPs) included in SoCs installed in terminals.

The term "UICC", as used herein, may be interchangeably used with the term "SIM", and the term "eUICC" may be interchangeably used with the term "eSIM".

The term "secondary platform bundle (SPB)", as used herein, is driven by using the resources of a PP of an SSP on the PP. For example, a UICC bundle may refer to a software package of an application, a file system, an authentication key value, and the like that are stored in an existing UICC together with an HLOS that operates them.

The term "USIM profile", as used herein, may mean a profile, or a software package of information contained in a USIM application of a profile.

An operation of a terminal or an external server enabling a bundle, as used herein, may refer to an operation of changing a state of a corresponding profile (ok?) to an enabled state so that the terminal may receive services (e.g., a communication service, a credit card payment service, and a user authentication service through a mobile operator) that are provided by the bundle. The bundle in the enabled state may be expressed as an "enabled bundle". The bundle in the enabled state may be stored in an encrypted state in a storage space inside or outside an SSP.

An enabled bundle in the disclosure may be changed to an active state according to bundle external inputs (e.g., a user input, a push, a request of an application within a terminal, an authentication request of a mobile operator, and a PP management message) or according to internal operations of the bundle (e.g., a timer operation and polling). A bundle in an active state may refer to the bundle being loaded in a driving memory inside an SSP from a storage space inside or outside the SSP, processing security information by using a secure CPU inside the SSP, and providing a security service to a terminal.

An operation of a terminal or an external server disabling a bundle, as used herein, may refer to an operation of changing a state of the bundle to a disabled state so that the terminal may not receive services that are provided by the bundle. The profile (or a bundle) in the disabled state may be expressed as a "disabled bundle". The bundle in the disabled state may be stored in an encrypted state in a storage space inside or outside an SSP.

An operation of a terminal or an external server deleting a bundle, as used herein, may refer to an operation of changing a state of the bundle to a deleted state so that the terminal or the external server may not enable or disable the bundle any longer. The profile (or a bundle) in the deleted state may be expressed as a "deleted bundle".

The term "bundle management server", as used herein, may provide a function of generating a bundle in response to a request from a service provider or another bundle management server, encrypting a generated bundle, generating a bundle remote management command, or encrypting the generated bundle remote management command. A bundle management server that provides the above-described function may be represented by at least one of an SPB manager, a remote bundle manager (RBM), an image delivery server (IDS), a subscription manager data preparation (SM-DP) platform, a subscription manager data preparation plus (SM-DP+) platform, a manager bundle server, a managing SM-DP+ platform, a bundle encryption server, a bundle generation server, a bundle provisioner (BP), a bundle provider, or a bundle provisioning credentials (BPC) holder.

In the disclosure, a bundle management server may perform a function of managing settings of a key and a certificate for downloading, installing or updating a bundle in an SSP and remotely managing the state of the bundle. A bundle management server that provides the above-described function may be represented by at least one of an SPB manager (SPBM), a remote bundle manager (RBM), an image delivery server (IDS), subscription manager secure routing (SM-SR), subscription manager secure routing plus (SM-SR+), off-card entity of eUICC profile manager, a profile management credentials (PMC) holder, or an eUICC manager (EM).

The term "intermediary server", as used herein, may be represented by at least one of an SPBM, an RBM, a secondary platform bundle discovery sever (SPBDS), a bundle discovery sever (BDS), a subscription manager discovery service (SM-DS), a discovery service (DS), a root SM-DS, or an alternative SM-DS. An intermediary server may receive an event registration request from one or more bundle management servers or intermediary servers. Also, one or more intermediary servers may be used in combination, and in this case, a first intermediary server may receive an event registration request not only from a bundle management server but also from a second intermediary server. In this disclosure, a function of an intermediary server may be combined into a bundle management server.

The bundle management server in this disclosure may be a general term for a combination of a function of generating, encrypting, and transmitting a bundle or a bundle remote management command with a function of setting an SSP and managing an installed bundle. The bundle management server in this disclosure may also be a general term for a combination of the functions of an intermediary server with a function of generating, encrypting, and transmitting a bundle or a bundle remote management command and a function of setting an SSP and managing an installed bundle. Accordingly, according to various embodiments of the disclosure, operations of the bundle management server and the intermediary server may be performed in a single bundle management server. Alternatively, respective operations of the bundle management server and the intermediary server may be performed in a plurality of independent bundle management servers. In the specification of the disclosure, the bundle management server or the intermediary server may be expressed as a bundle server. The bundle server may be one of the bundle management server and the intermediary server, or may be a device including both the bundle management server and the intermediary server.

The bundle management server and the intermediary server in this disclosure may be collectively referred to as an SPBM or RBM. The bundle server may be referred to as a bundle management server.

The term "terminal", as used herein, may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or others. Examples of a terminal may include a cellular phone, a smartphone having a wireless communication function, a personal digital assistant (PDA) having a wireless communication function, a wireless modem, a portable computer having a wireless communication function, an imaging apparatus such as a digital camera having a wireless communication function, a gaming apparatus having a wireless communication function, a home appliance for storing and playing music having a wireless communication function, an Internet home appliance capable of wireless Internet access and browsing, and a portable unit or terminal having a combination of the above functions. Further, examples of a terminal may include, but are not limited to, a Machine to Machine (M2M) terminal and a Machine Type Communication (MTC) terminal/device. In the disclosure, a terminal may be referred to as an electronic apparatus.

In the disclosure, an electronic apparatus may be embedded with an SSP, which may download and install a bundle. When an SSP is not embedded in an electronic apparatus, the SSP that is physically separated from the electronic apparatus may be inserted into the electronic apparatus to be connected to the electronic apparatus. For example, the SSP may be inserted into the electronic apparatus in a card form. The electronic apparatus may include a terminal. In this case, the terminal may be a terminal including the SSP which may download and install the bundle. The SSP may be embedded in the terminal, or when the terminal is separated from the SSP, the SSP may be inserted into the terminal to be connected to the terminal.

The terminal or the electronic apparatus may include software or an application installed in the terminal or the electronic apparatus to control the SSP. The software or the application may be referred to as, for example, a local bundle assistant (LBA) or a local bundle manager (LBM).

The term "bundle delimiter", as used herein, may be referred to as an SPB identifier (ID), an SPB family ID, a bundle matching ID, or a factor matching an event ID. The SPB ID may denote a unique identifier of each bundle. The SPB family ID may denote an identifier for identifying the type of a bundle (e.g., a telecom bundle for connection to a mobile operator network). The bundle delimiter may be used as a value of a bundle management server capable of indexing a bundle. The term "SSP ID", as used herein, may be a unique identifier of an SSP embedded in a terminal, and may be referred to as an sspID. According to an embodiment of the disclosure, when a terminal is not separated from an SSP chip, an SSP ID may be a terminal ID. The SSP ID may also be referred to as a particular SPB ID within an SSP. In more detail, the SSP ID may be referred to as a bundle ID of a management bundle or loader (SPBL, Secondary Platform Bundle Loader) that manages installation, enabling, disabling, and deletion of other bundles in an SSP. The SSP may have a plurality of SSP IDs, and the plurality of SSP IDs may be values induced from a unique single SSP ID.

The loader (SPBL, Secondary Platform Bundle Loader) in this disclosure may be referred to as a management bundle that manages installation, enabling, disabling, and deletion of other bundles in an SSP. An LBA of a terminal, or a remote server, may install, enable, disable, and delete a particular bundle through a loader. In the disclosure, the loader may also be referred to as an SSP.

The term "bundle provisioning credentials (BPC)", as used herein, may be a means used for mutual authentication, bundle encryption, and signing between a bundle management server and an SSP. The BPC may include at least one of a symmetric key, a Rivest Shamir Adleman (RSA) certificate and private key, an elliptic curved cryptography (ECC) certificate and private key, a root certification authority (CA), or a certificate chain. Further, when multiple profile management servers are provided, different BPCs may be stored in an SSP or used for the multiple profile management servers.

The term "profile management credentials (PMC)", as used herein, may be a means used for mutual authentication, transmission data encryption, and signing between a profile management server and an eUICC. The PMC may include at least one of a symmetric key, an RSA certificate and private key, an ECC certificate and private key, a root CA, or a certificate chain. Further, when multiple profile management servers are provided, different PMCs may be stored in an eUICC or used for the multiple profile management servers.

The term "event", as used herein, may be a general term for bundle download, remote bundle management, or other bundle or SSP management/processing command. The event may be named as a remote bundle provisioning operation (or an RSP operation) or event record, and each event may be referred to as data including at least one of an event identifier (event ID) or matching identifier (matching ID) corresponding to the event, or an address (a fully qualified domain name (FQDN), an Internet protocol (IP) address, or a uniform resource locater (URL)) or ID of a bundle management server or intermediary server in which the event is stored. The term "bundle download" may be interchangeably used with "bundle installation". Further, the term "event type" may be used to indicate whether a specific event is bundle download, remote profile management (e.g., deletion, enabling, disabling, replacement, or update), or other bundles or SSP management/processing command, and the term "event type" may be referred to as an operation type (or OperationType), an operation class (or OperationClass), an event request type, an event class, or an event request class.

In the disclosure, the term "bundle image, or image" may be interchangeably used with a bundle or may be used to indicate a data object of a specific bundle, and may be referred to as a bundle tag-length-value (TLV) or bundle image TLV. When a bundle image is encrypted by using an encryption parameter, the bundle image may be referred to as a protected bundle image (PBI) or a protected bundle image TLV (PBI TLV). When a bundle image is encrypted by using an encryption parameter that may be decrypted only by a specific SSP, the bundle image may be referred to as a bound bundle image (BBI) or a bound bundle image TLV (BBI TLV). A bundle image TLV may be a data set representing information that constitutes a profile in a TLV format.

In the disclosure, local bundle management (LBM) may be referred to as bundle local management, local management, a local management command, a local command, an LBM package, a bundle local management package, a local management package, a local management command package, or a local command package. The LBM may be used to change enabled, disabled, and deleted states of a specific bundle through software or the like installed in a terminal or update contents of the specific bundle (e.g., a bundle nickname or bundle metadata). Each LBM may include one or more local management commands. In this case, bundles which are objects of local management commands may be the same as or different from one another.

In the disclosure, remote bundle management (RBM) may be referred to as bundle remote management, remote management, a remote management command, a remote command, an RBM package, a bundle remote management package, a remote management package, a remote management command package, or a remote command package. The RBM may be used to change a state (e.g., enabled, disabled, or deleted) of a specific bundle or update contents of the specific bundle (e.g., a bundle nickname or bundle metadata). Each RBM may include one or more remote management commands, and profiles that are objects of the remote management commands may be the same as or different from one another.

In the disclosure, a target bundle may be used to indicate a bundle that is an object of a local management command or remote management command.

The term "certificate" or "digital certificate", as used herein, may refer to a digital certificate used for mutual authentication based on an asymmetric key including a pair of a public key (PK) and a secret key (SK). Each certificate may include one or more PKs, a public key identifier (PKID) corresponding to each PK, an ID of a certificate issuer (CI) issuing the certificate, and a digital signature. Also, the term "CI" may be referred to as a certification issuer, a certificate authority (CA), or certification authority. The term "PK" and the term "PKID", as used herein, may be interchangeably used with a specific PK or a certificate including the specific PK, a part of a specific PK or a part of a certificate including the specific PK, a calculation result (e.g., hash) value of a specific PK or a calculation result (e.g., hash) value of a certificate including the specific PK, a calculation result (e.g., hash) value of a part of a specific PK or a calculation result (e.g., hash) value of a part of a certificate including the specific PK, or a storage space in which data is stored.

In this disclosure, when certificates (primary certificates) issued by one CI are used to issue other certificates (secondary certificates) or secondary certificates are continuously used to issue tertiary or more certificates, a correlation between the certificates may be referred to as a certificate chain or certificate hierarchy. In this case, a CI certificate used to initially issue a certificate may be referred to as a root of certificate, an uppermost certificate, a root CI, a root CI certificate, a root CA, or a root CA certificate.

The term "service provider", as used herein, may refer to a company that requests a bundle management server to generate a bundle by issuing a requirement to the bundle management server and provides a service to a terminal through the bundle. For example, the service provider may indicate a mobile operator that provides a communication network accessing service through a bundle equipped with a communication application, and may be a general term for a business supporting system (BSS) of the mobile operator, an operational supporting system (OSS), a point of sale (PoS) terminal, and other IT systems. In the disclosure, the service provider may be used as a term referring to not only a particular company, but also to a group, an association, or a consortium of one or more companies, or a representative of the group, the association, or the consortium. In the disclosure, the service provider may be referred to as an operator (OP or Op.), a bundle owner (BO), an image owner (IO), or the like, and each service provider may set at least one of a name or an object identifier (OID) of the service provider or may be assigned with the same. When a service provider indicates a group, association, or representative of one or more companies, a name or a unique ID of the group, association, or representative may be a name or a unique ID shared among all companies belonging to the group or association or all companies cooperating with the representative.

The term "AKA" stands for authentication and key agreement and may indicate an authentication algorithm for accessing 3rd generation partnership project (3GPP) and 3GPP2 networks.

The term "K (or K value)", as used herein, may be an encryption key value stored in an eUICC used for an AKA authentication algorithm.

The term "OPc", as used herein, may be a parameter value that may be stored in an eUICC used for an AKA authentication algorithm.

The term "NAA", as used herein, may be a network access application program and may be an application program such as a USIM or an ISIM stored in an UICC to access a network. An NAA may be a network access module.

The term "telecom bundle", as used herein, may be a bundle including at least one NAA mounted therein or including a function of remotely downloading and installing at least one NAA. In the disclosure, the telecom bundle may include a telecom bundle ID that identifies the telecom bundle.

In the description of the disclosure, certain detailed explanations of related known functions or configurations are omitted when it is deemed that they may unnecessarily obscure the subject matter of the disclosure.

Various embodiments of the disclosure with respect to a method and apparatus for installing and managing a bundle online through a remote server will now be described.

FIG. 1 illustrates a diagram of a mobile communication network connection method of a terminal using an SSP in which telecom bundles including profiles are mounted, according to an embodiment of the disclosure.

As shown in FIG. 1, an SSP 120 may be embedded in an SoC 130 of a terminal 110. The SoC 130 may be a communication processor, an application processor, or a processor into which the two processors are integrated. The SSP 120 may be a detachable SSP 122 in the form of an independent chip without being integrated into an SoC, or may be an embedded SSP 124 previously embedded in the terminal 110.

A bundle including a profile may mean the bundle includes 'access information' for accessing a specific mobile operator. For example, the access information may include an International Mobile Subscriber Identity (IMSI) that is a subscriber delimiter and a K or Ki value needed to authenticate a subscriber to a network along with the subscriber delimiter.

The terminal 110 may perform authentication along with an authentication processing system (e.g., a home location register (HLR) or an authentication center (AuC)) of a mobile operator by using at least one from among telecom bundles 140 and 150 installed within the SSP 120. For example, this authentication may be an AKA process. When the authentication succeeds, the terminal 110 may use a mobile communication service such as a phone call or the use of mobile data by using a mobile communication network 160 of a mobile communication system. The two telecom bundles 140 and 150 may store different pieces of authentication information, and the terminal 110 may use a mobile communication network by allowing the two telecom bundles 140 and 150 to operate simultaneously or in a time-multiplexing manner according to setup.

The terminal 110 may use an online payment through a terminal app or an offline payment through an external credit card PoS apparatus by using a payment bundle 170 installed within the SSP 120, and may authenticate the identity of a terminal owner by using an electronic ID (eID) bundle 180.

Figure 2:
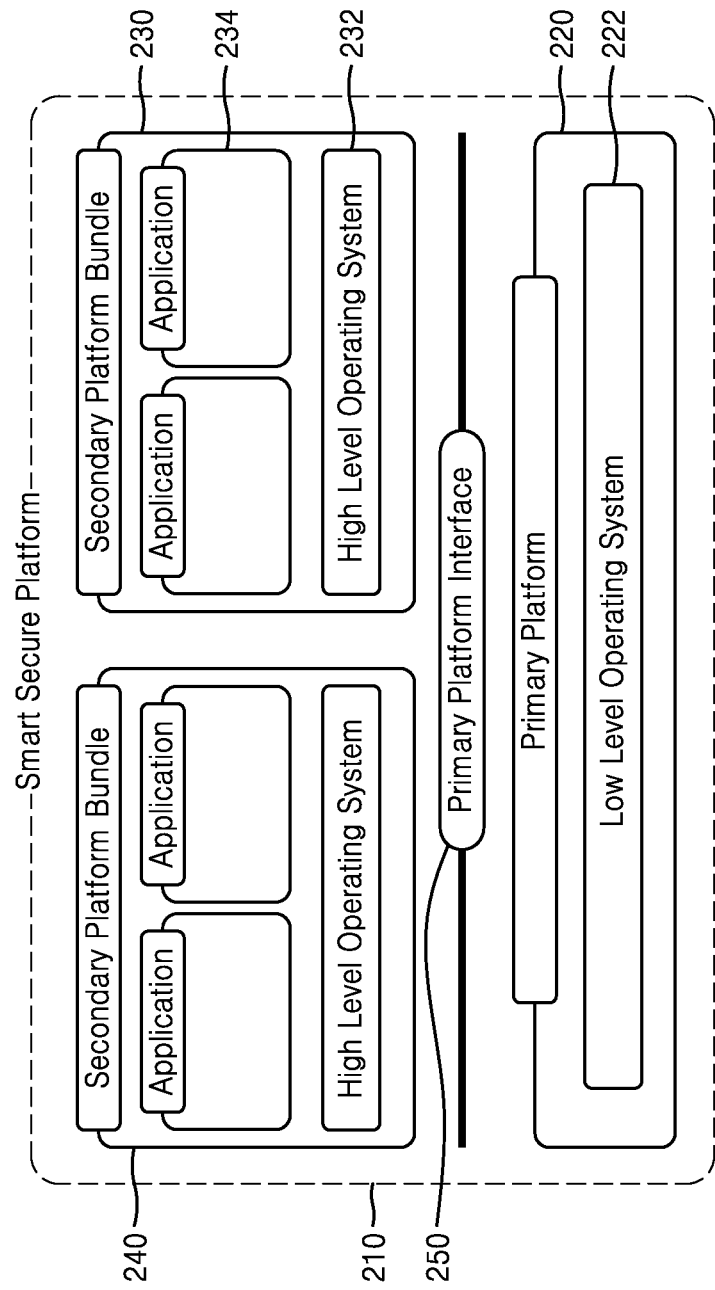
FIG. 2 illustrates a conceptual diagram of an internal structure of an SSP according to an embodiment of the disclosure.

FIG. 2 illustrates a conceptual diagram of an internal structure of an SSP 210 according to an embodiment of the disclosure.

Referring to FIG. 2, the SSP 210 may include a primary platform (PP) 220, and at least one secondary platform bundle (SPB), namely, two SPBs 230 and 240, operating on the PP 220. The PP 220 may include hardware (not shown) and at least one LLOS 222. The SPB 230 may include an HLOS 232, and at least one application 234 operating on the HLOS 232. The SPBs 230 and 240 may access resources such as a central processing device and a memory of the PP 220 by using a PPI 250, and accordingly may be driven in the SSP 210.

Figure 3:
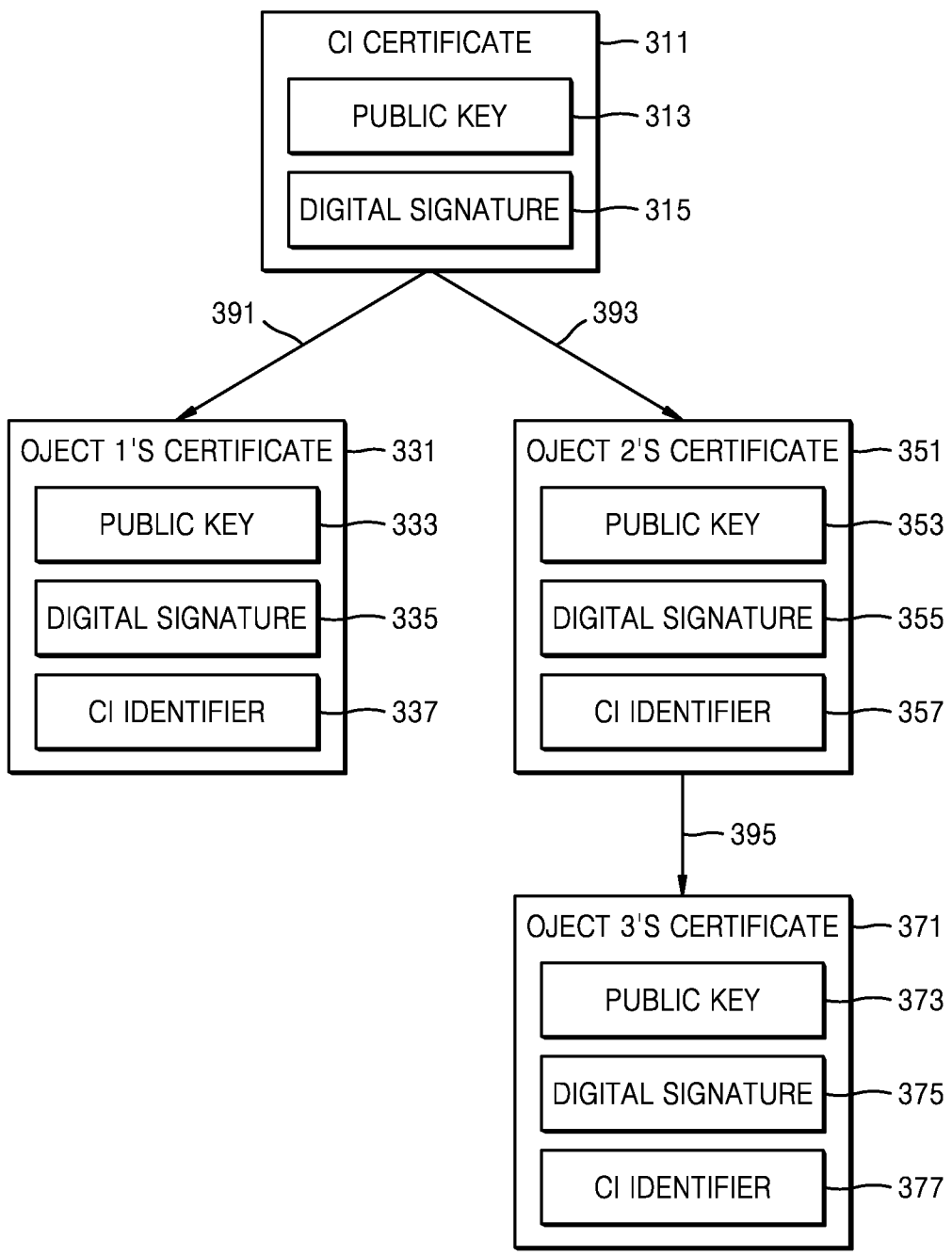
FIG. 3 illustrates a certificate hierarchy or certificate chain of a certificate issued by a certificate issuer (CI), and a public key and a digital signature of a CI included in each certificate, according to an embodiment of the disclosure.

FIG. 3 illustrates a certificate hierarchy or certificate chain of a certificate issued by a certificate issuer (CI), and a public key and a digital signature of a CI included in each certificate, according to an embodiment of the disclosure.

Referring to FIG. 3, the CI may generate a public key 313 and a secret key which are to be used by the CI, generate a CI certificate 311 by including the public key 313 in the certificate of the CI, and attach, to the certificate, a digital signature 315 generated by using the secret key in the certificate of the CI.

Referring to FIG. 3, the CI certificate 311 may be used to issue an object 1's certificate 331, as indicated by reference numeral 391. The object 1 may be, for example, a bundle management server (SPBM). The object 1 may generate a public key 333 and a secret key which are to be used by the object 1, and generate the object 1's certificate 331 by including the public key 333 in the certificate of the object 1. The object 1 may request the CI for a digital signature 335 of the CI by using the secrete key of the CI and may receive the digital signature 335. The object 1's certificate 331 may include a CI identifier 337 corresponding to the CI public key 313 that is to be used to check the digital signature 335 of the CI included in the object 1's certificate 331. The CI identifier 337 may include at least one of a CI public key ID or a CI identifier (CI ID, CI Object ID, Object Universally Unique Identifier, or Object UUID).

Referring to FIG. 3, the CI certificate 311 may be used to issue an object 2's certificate 351, as indicated by reference numeral 393. The object 2 may be, for example, an SSP maker. The object 2 may generate a public key 353 and a secret key which are to be used by the object 2, and generate the object 2's certificate 351 by including the public key 353 in the certificate of the object 2. The object 2 may request the CI for a digital signature 355 of the CI by using the secrete key of the CI and may receive the digital signature 355. The object 2's certificate 351 may include a CI identifier 357 corresponding to the CI public key 313 that is to be used to check the digital signature 355 of the CI included in the object 2's certificate 351. The CI identifier 357 may include at least one of a CI public key ID or a CI identifier (CI ID, CI Object ID, Object Universally Unique Identifier, or Object UUID). The digital signatures 335 and 355 included in the object 1's certificate 331 and the object 2's certificate 351 may have different values, but the CI identifiers 337 and 357 may have the same values.

Referring to FIG. 3, the object 2's certificate 351 may be used to issue an object 3's certificate 371, as indicated by reference numeral 395. The object 3 may be an SSP manufactured by the SSP maker or a secondary platform bundle loader (SPBL) mounted within the SSP. The object 3 may generate a public key 373 and a secret key which are to be used by the object 3, and generate the object 3's certificate 371 by including the public key 373 in the certificate of the object 3. The object 3 may request the object 2 for a digital signature 375 of the object 2 by using the secrete key of the object 2 and may receive the digital signature 375. The object 3's certificate 371 may include a CI identifier 377 corresponding to the public key 353 of the object 2 that is to be used to check the digital signature 375 of the object 2 included in the object 3's certificate 371. The CI identifier 377 may include at least one of a public key ID of the CI or a CI identifier (Object ID, Object Universally Unique Identifier, or Object UUID).

All of the object 1's certificate 331, the object 2's certificate 351, and the object 3's certificate 371 illustrated in FIG. 3 may have the same CI certificate 311 as an uppermost certificate or a root of certificate. Accordingly, the object 1, the object 2, and the object 3 may need the CI certificate 311 or the CI public key 313 included in the CI certificate 311, in order to authenticate one another. In more detail, in the example of FIG. 3, in order for the object 1 and the object 2 to authenticate each other by using a digital certificate and a signature, the object 1 may need the signature of the object 2, the object 2's certificate 351, and the CI public key 313, and the object 2 may need the signature of the object 1, the object 1's certificate 331, and the CI public key 313. In the example of FIG. 3, in order for the object 1 and the object 3 to authenticate each other by using a digital certificate and a signature, the object 1 may need the signature of the object 3, the object 3's certificate 371, and the CI public key 313, and the object 3 may need the signature of the object 1, the object 1's certificate 331, and the CI public key 313. In this case, the object 2's certificate 351 in relation to the object 3's certificate 371 may be referred to as a sub certificate issuer (Sub CI) or sub certificate authority (Sub CA) certificate.

Figure 4:
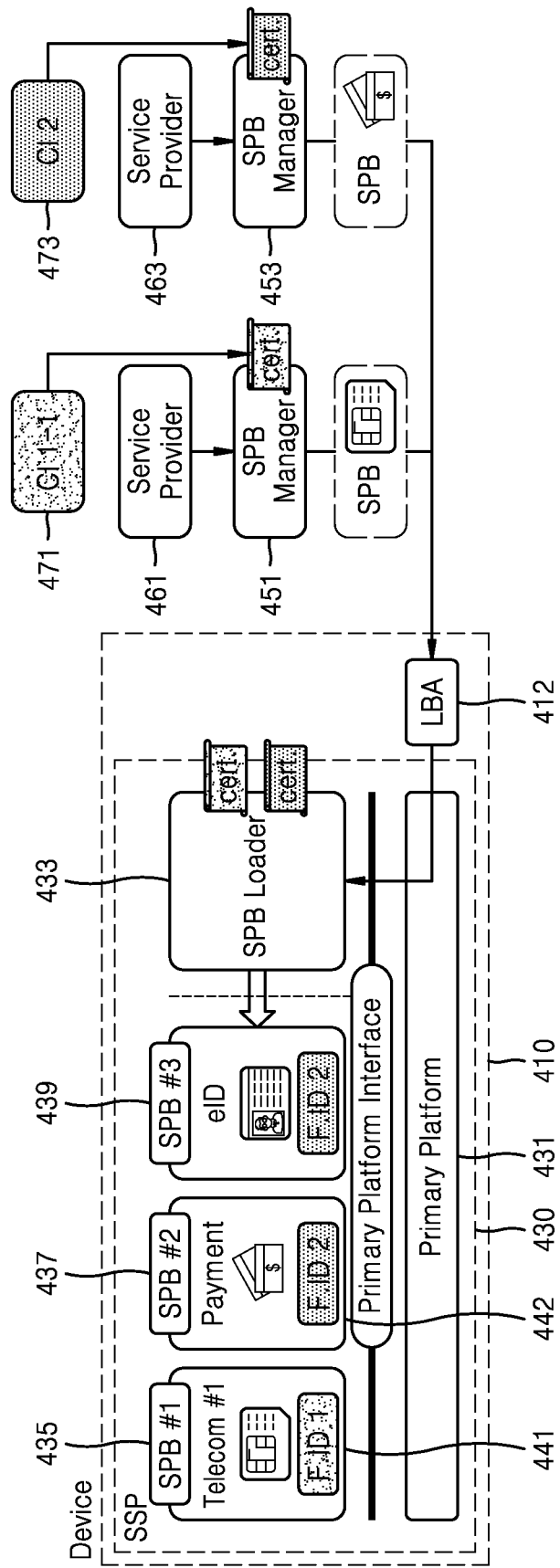
FIG. 4 illustrates a block diagram of internal and external components of a terminal for downloading and installing a bundle into an SSP, according to an embodiment of the disclosure.

FIG. 4 illustrates a block diagram of internal and external components of a terminal for downloading and installing a bundle into and in an SSP, according to an embodiment of the disclosure.

A terminal 410 in FIG. 4 may be a terminal in which an SSP 430 has been mounted and an LBA 412 for controlling the SSP 430 has been installed. The SSP 430 may be embedded or detachably mounted in the terminal 410. The SSP 430 may include a PP 431, an SPBL 433, and one or more SPBs 435, 437, and 439. The SPB 435, 436, or 437 may not be installed within the SSP 430 at the moment when the terminal 410 is released to the market, and may be downloaded and installed remotely after the terminal 410 is released to the market.

Referring to FIG. 4, each bundle may have a unique family ID (e.g., 441 or 442). The SSP 430 or the SPBL 433 may store and manage certificate information that is to be used when downloading and installing bundles assigned with different family IDs. Certificate information that is classified and managed for each family ID may exist on a certificate hierarchy of certificates issued by different CIs. When a bundle is downloaded from a bundle management server 451 or 453 and installed, the SSP 430 or the SPBL 433 may select certificate information set for a bundle family ID allocated to a bundle and may transmit the selected certificate information to the bundle management server 451 or 453. The certificate information may be a certificate or public key of a CI of a corresponding certificate hierarchy, and may be an ID corresponding to the certificate and the public key (e.g., a CI ID, CI Object ID, Object Universally Unique Identifier, Object UUID, or CI Public Key ID).

Figure 5:
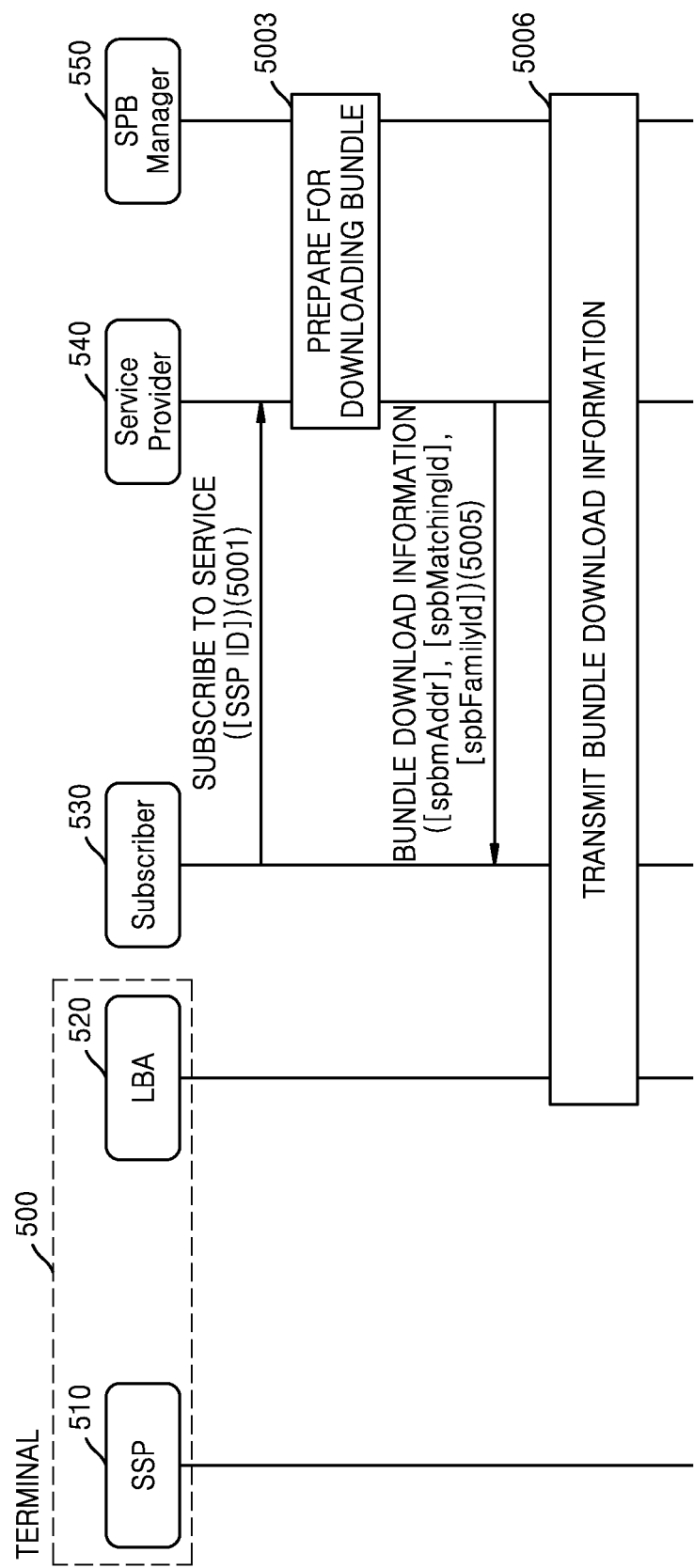
FIG. 5 illustrates a diagram of a procedure in which a subscriber subscribes to a service through a service provider and the service provider and a bundle management server prepare for downloading of a bundle, according to an embodiment of the disclosure.

FIG. 5 illustrates a diagram of a procedure in which a subscriber subscribes to a service through a service provider and the service provider and a bundle management server prepares for downloading a bundle, according to an embodiment of the disclosure.

A terminal 500 in FIG. 5 may be a terminal in which an SSP 510 has been mounted and an LBA 520 for controlling the SSP 510 has been installed. Although not shown in FIG. 5, a bundle requested by a service provider 540 may be generated and be on standby in a bundle management server 550, and the service provider 540 may hold at least one of a bundle ID (SPB ID) of the generated bundle, a bundle family ID (SPB Family ID), or an address (SPBM Addr) of the bundle management server 550.

Referring to FIG. 5, in operation 5001, a subscriber 530 may select and subscribe to a service (e.g., a data service through a mobile communication network) provided by the service provider 540. At this time, the subscriber 530 may selectively transmit, to the service provider 540, an ID (SSP ID) of the SSP 510 installed in the terminal 500 in which a bundle is to be installed to use a service provided by the service provider 540.

In operation 5003, the service provider 540 and the bundle management server 550 may perform a bundle downloading preparation procedure. In operation 5003, the service provider 540 may selectively transmit, to the bundle management server 550, the ID (SSP ID) of the SSP 510 in which a bundle is to be installed, and may transmit, to the bundle management server 550, at least one of a specific bundle ID (SPB ID) of a specific bundle capable of providing a service selected by a subscriber from among bundles prepared by a server, or a bundle family ID (SPB Family ID). In operation 5003, the bundle management server 550 may select one of a bundle having the received specific bundle ID or a bundle having the received bundle family ID, and may transmit the ID of the selected bundle to the service provider 540. The service provider 540 or the bundle management server 550 may newly generate a bundle matching ID capable of identifying the selected bundle. The bundle management server 550 may manage the received SSP ID connected to the selected bundle. In operation 5003, the bundle management server 550 may transmit a bundle management server address (SPBM Addr) capable of downloading the selected bundle. The bundle management server address may be the address of a bundle management server having a prepared bundle stored therein or the address of another bundle management server, or may be the address of another bundle management server capable of storing and obtaining download information (e.g., a server address) of the prepared bundle.

Referring to FIG. 5, in operation 5005, the service provider 540 may transmit bundle download information of a prepared bundle to the subscriber 530. At least one of a bundle management server address (SPBM Addr) of a bundle management server in which a bundle has been prepared, a bundle Matching ID of the prepared bundle, or a bundle family ID (SPB Family ID) of the prepared bundle may be selectively transmitted as the bundle download information.

Referring to FIG. 5, in operation 5006, the bundle download information may be transmitted to the LBA 520 of the terminal 500. The bundle download information may be at least one of a bundle management server address (SPBM Addr) of a bundle management server to which the LBA 520 is to access, a bundle delimiter of a bundle prepared in operation 5003, or a bundle family ID (SPB Family ID) of the prepared bundle. The bundle delimiter may include at least one of the bundle Matching ID generated in operation 5003 or a bundle Event ID. The bundle delimiter may include the bundle family ID of the prepared bundle. The bundle event ID may include at least one of the bundle Matching ID of the bundle prepared in operation 5003 or the address of a bundle management server. The bundle download information may be input by the subscriber 530 to the LBA 520 (e.g., QR code scanning or direct character inputting), or may be input to the LBA 520 via an information providing server (not shown) by using a push input. The LBA 520 may access the information providing server (not shown) previously set in the terminal 500 and may receive the bundle download information.

Figure 6:
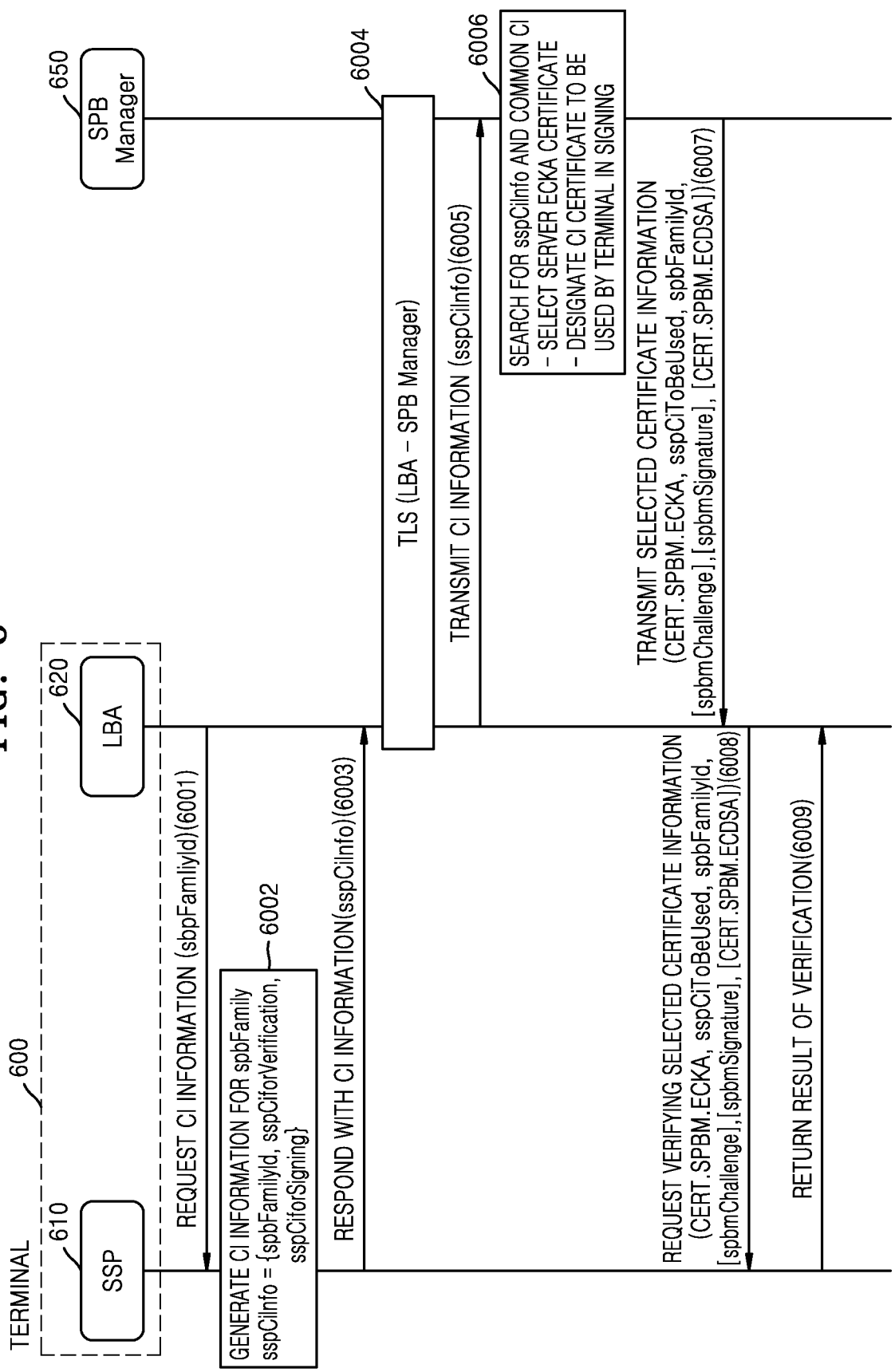
FIG. 6 illustrates a diagram of a procedure of negotiating a certificate to select a certificate that may be used in mutual authentication and encryption between a terminal and a bundle management server, according to an embodiment of the disclosure.

FIG. 6 illustrates a diagram of a procedure of negotiating a certificate to select a certificate that may be used in mutual authentication and encryption between a terminal and a bundle management server, according to an embodiment of the disclosure.

Referring to FIG. 6, in operation 6001, an LBA 620 may request an SSP 610 for all CI information that the SSP 610 may support for a bundle having a specific bundle family ID. In operation 6001, the LBA 620 may request the SSP 610 for CI information including the specific bundle family ID. Although not shown in FIG. 6, information (sspCiForSigning) about CIs having issued certificates for different bundle family IDs to an SSP and information (sspCiForVerification) about bundle management server certificate issuing CIs trusted by the SSP may be pre-set in the SSP 610.

The information (sspCiForSigning) about CIs having issued certificates to an SSP may mean CI information about a CI having issued an SSP certificate to the SSP, and the LBA 620 may provide the SSP certificate to the bundle management server 650 to achieve mutual authentication between the SSP 610 and the bundle management server 650.

The information (sspCiForVerification) about bundle management server certificate issuing CIs trusted by an SSP may mean information about CIs that issue certificates of which validity may be verified by an SSP, and may mean that the bundle management server 650 provides a bundle management server certificate existing in a certificate hierarchy (or certificate chain) of a corresponding CI to the LBA 620 and the SSP 610 is able to verify the bundle management server certificate. The CI information may include at least one of a CI public key ID or a CI identifier (CI ID, CI Object ID, Object Universally Unique Identifier, or Object UUID).

Referring to FIG. 6, in operation 6002, the SSP 610 may extract the bundle family ID provided by the LBA 620 and the CI information set in the bundle family ID to generate CI information (sspCiInfo) for a specific bundle family ID. In operation 6003, the CI information (sspCiInfo) for a specific bundle family ID may be transmitted to the LBA 620. The CI information (sspCiInfo) for the specific bundle family ID may include a bundle family ID, information (sspCiForSigning) about CIs having issued certificates to an SSP set for the bundle family ID, and information (sspCiForVerification) about bundle management server certificate issuing CIs trusted by the SSP.

Although not shown in FIG. 6, in operation 6002, the SSP 610 may transmit, to the LBA 620, SSP version information including at least one of pieces of version(or release) information of the standards that are supported(or implemented) by a PP and a loader included in the SSP 610.

Referring to FIG. 6, in operation 6004, the LBA 620 and the bundle management server 650 may perform a Transport Layer Security (TLS) connection. The TLS connection in operation 6004 may use a server authentication method in which the LBA 620 identifies the bundle management server 650, from among TLS connection methods. During the TLS connection in operation 6004, when the LBA 620 identifies the bundle management server 650, the bundle management server 650 may submit a TLS certificate to the LBA 620. The LBA 620 or the terminal 600 may store at least one of a CI certificate or public key for verifying the validity of the TLS certificate. When one or more Sub CI certificates are needed to verify the validity of the TLS certificate of the bundle management server 650, the bundle management server 650 may submit the one or more Sub CI certificates together with the TLS certificate to the LBA 620, in operation 6004. When the TLS connection is established, all messages between the LBA 620 and the bundle management server 650 may be protected according to a TLS security procedure.

In operation 6005, the LBA 620 may request the bundle management server 650 to start a certificate negotiation. In operation 6005, the LBA 620 may transmit to the bundle management server 650 all pieces of CI information supportable by the SSP 610 based on the CI information (sspCiInfo) for the specific bundle family ID of the SSP 610 identified by the LBA 620 in operation 6003. Although not illustrated in FIG. 6, in operation 6005, the LBA 620 may additionally transmit the SSP version(or release) information to the bundle management server 650.

Although not shown in FIG. 6, information (ssbmCiForSigning) about CIs having issued certificates for different bundle family IDs to a bundle management server, and information (spbmCiForVerification) about SSP certificate issuing CIs trusted by the bundle management server may be pre-set in the bundle management server 650.

The information (spbmCiForSigning) about CIs having issued certificates to a bundle management server may mean information about CIs having issued bundle management server certificates to corresponding bundle management servers, and the bundle management server 650 may provide the bundle management server certificates to the LBA 620 to achieve mutual authentication with the SSP 610.

The information (spbmCiForVerification) about SSP certificate issuing CIs trusted by the bundle management server 650 may mean information about CIs that issue certificates of which validity may be verified by the bundle management server 650, and may mean that, when an SSP certificate existing in a certificate hierarchy(or certificate chain) of the CIs is transmitted to the bundle management server 650 via the LBA 620 to achieve mutual authentication between an SSP and a bundle management server, the bundle management server 650 is able to verify the SSP certificate. The information about the CIs may include at least one of a CI public key ID or a CI identifier (CI ID, CI Object ID, Object Universally Unique Identifier, or Object UUID).

In operation 6006, the bundle management server 650 may compare the CI information (sspCiInfo) for the bundle family ID of the SSP 610 received in operation 6005 with CI information for the same bundle management ID set in the bundle management server 650, and may select a selected bundle family ID, a certificate of the bundle management server 650 that is to be transmitted to the terminal 600, and CI information (sspCiToBeUsed) that is to be used by an SSP.

The certificate of the bundle management server 650 that is to be transmitted to the terminal 600 may be a certificate (CERT.SPBM.ECKA) for Key Agreement. The certificate of the bundle management server 650 that is to be transmitted to the terminal 600 may be a bundle management server certificate existing in a hierarchy(or chain) of at least one CI from among common CI information of the information (sspCiForVerification) about bundle management server certificate issuing CIs trusted by the SSP and the information (spbmCiForSigning) about CIs having issued certificates to a bundle management server, for the specific bundle family ID transmitted to the bundle management server 650 in operation 6005.

The information (sspCiToBeUsed) that is to be used by an SSP may include at least one common CI information of the information (sspCiForSigning) about CIs having issued certificates to a bundle management server for the specific bundle family ID transmitted to the bundle management server 650 in operation 6005 and the information (sspCiForVerification) about SSP certificate issuing CIs trusted by a bundle management server.

In operation 6007, the bundle management server 650 may return the bundle management server certificate and the CI information selected in operation 6006 to the LBA 620. Information returned to the LBA 620 in operation 6007 may include at least one of the bundle management server certificate verifiable by the SSP 610, the CI information to be used by the SSP, or the bundle family ID, which are selected in operation 6006. When one or more Sub CI certificates are needed to determine whether the bundle management server certificate is valid, information returned to the LBA 620 may include one or more Sub CI certificates together with the bundle management server certificate.

The information returned to the LBA 620 in operation 6007 may also include a server challenge (spbmChallange) that may be selectively used by the SSP and the bundle management server for mutual authentication after operation 6007. The information returned to the LBA 620 in operation 6007 may selectively include a digital signature of the bundle management server that is transmitted to ensure the integrity of the returned information. In this case, the information returned to the LBA 620 in operation 6007 may also include bundle management server certificate (CERT.SPBM.ECDSA) for signing capable of determining whether the digital signature is valid. The bundle management server certificate (CERT.SPBM.ECDSA) for signing may be a certificate existing on the same CI hierarchy as the CI hierarchy on which the certificate selected in operation 6006 exists. When one or more Sub CI certificates are needed to determine whether the bundle management server certificate is valid, the information returned to the LBA 620 may include one or more Sub CI certificates together with the bundle management server certificate.

In operation 6008, the LBA 620 may request the SSP 610 to verify CI information and a certificate selected by the bundle management server 650. The CI information selected by the bundle management server 650 may include the bundle management server certificate verifiable by the SSP, the CI information to be used by the SSP, and the bundle family ID. The CI information selected by the bundle management server 650 may selectively include a server challenge (spbmChallange), a digital signature of the bundle management server for determining the integrity of the CI information, and the bundle management server certificate (CERT.SPBM.ECDSA) for signing capable of verifying the digital signature of the bundle management server. In operation 6008, the SSP 610 may compare the preset information (sspCiForSigning) about CIs having issued certificates for different bundle family IDs to an SSP and the preset information (sspCiForVerification) about bundle management server certificate issuing CIs trusted by the SSP with the bundle management server certificate verifiable by the SSP, the CI information to be used by the SSP, and the bundle family ID. In operation 6009, a result of authentication may be returned to the LBA 620. In operation 6009, the LBA 620 may store at least one of a verified bundle management server certificate, CI information to be used by the SSP, a bundle family ID, a bundle management server address, or a bundle management server challenge (spbmChallange).

Figure 7:
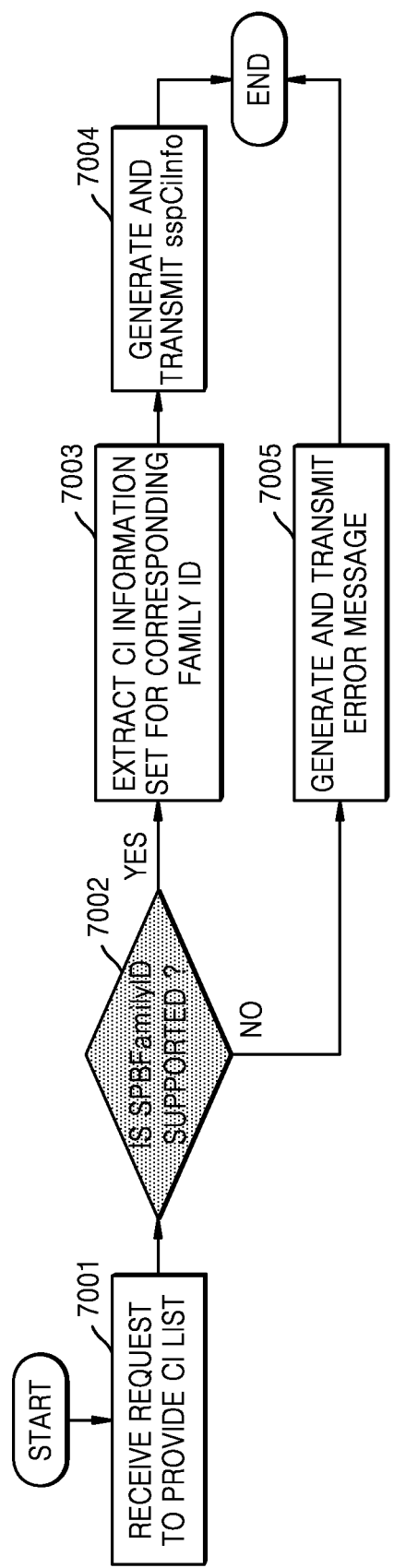
FIG. 7 illustrates a diagram of a procedure in which an SSP of a terminal generates all supportable CI information set for a specific bundle family identifier (ID) at a request from a local bundle assistant (LBA), according to an embodiment of the disclosure.

FIG. 7 illustrates a diagram of a procedure in which an SSP of a terminal generates all supportable CI information set for a specific bundle family ID at a request from an LBA, according to an embodiment of the disclosure.

Referring to FIG. 7, in operation 7001, the SSP may be requested by the LBA to provide all supportable CI information for a bundle having a specific bundle family ID. In operation 7002, the SSP may determine whether CI information set for a bundle family ID received from the LBA exists. When the CI information set for the bundle family ID received from the LBA exists, the SSP may extract a bundle family ID and CI information set for the bundle family ID, in operation 7003. In operation 7004, the SSP may generate CI information (sspCiInfo) for a specific bundle family ID and may transmit the generated CI information (sspCiInfo) to the LBA. The CI information (sspCiInfo) for the specific bundle family ID may include a bundle family ID, information (sspCiForSigning) about CIs having issued certificates to an SSP for which the bundle family ID has been set, and information (sspCiForVerification) about bundle management server certificate issuing CIs trusted by an SSP. The bundle family ID set for the SSP may be a specific value or a specific range, and may also include an empty value such as NULL. When it is determined in operation 7002 that the CI information set for a bundle family ID does not exist, the SSP may generate an error message and transmit the error message to the LBA, in operation 7005.

Figure 8:
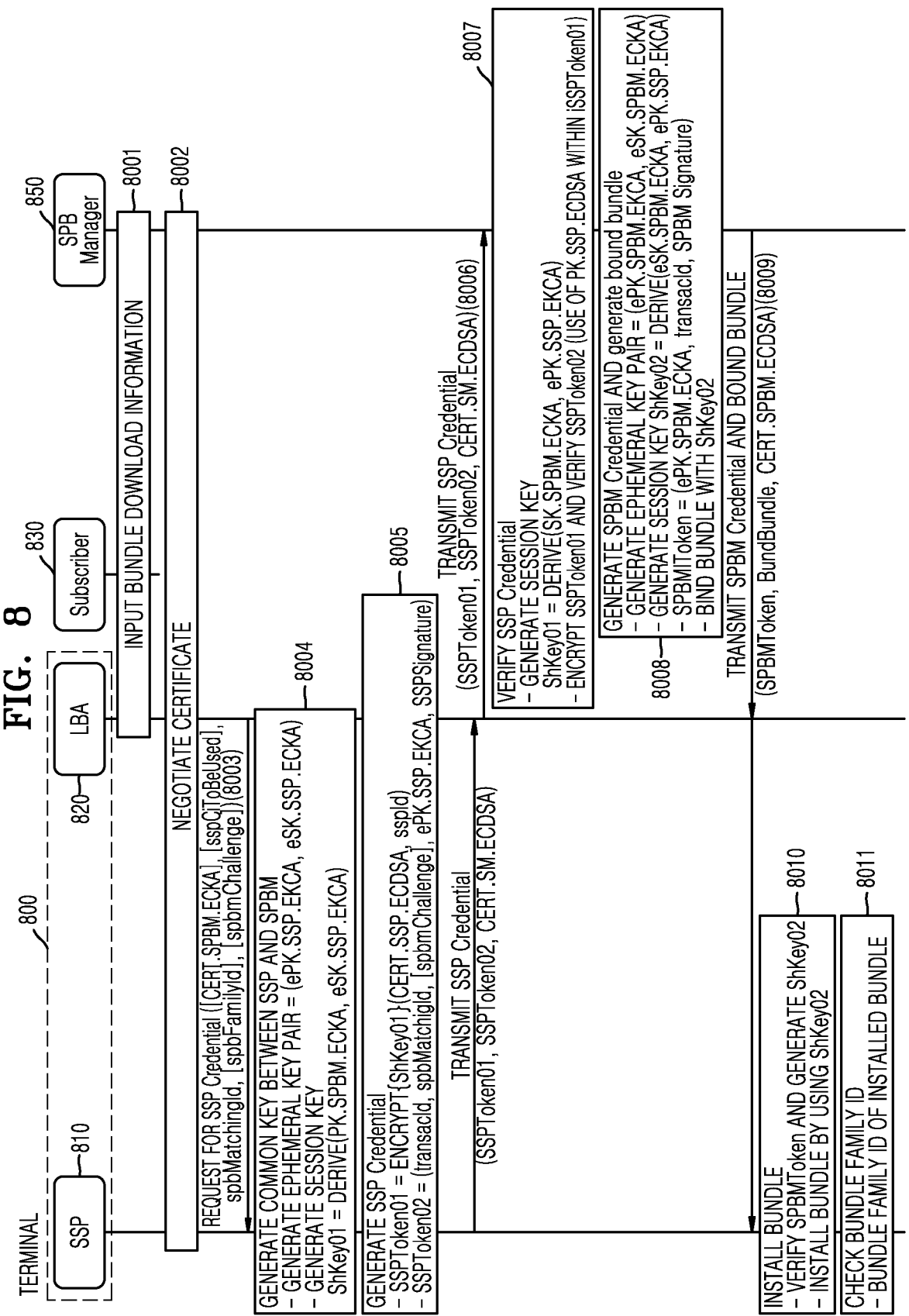
FIG. 8 illustrates a diagram of a procedure in which a terminal downloads a bundle from a bundle management server and installs the downloaded bundle, according to an embodiment of the disclosure.

FIG. 8 illustrates a diagram of a procedure in which a terminal downloads a bundle from a bundle management server and installs the downloaded bundle, according to an embodiment of the disclosure.

Referring to FIG. 8, in operation 8001, bundle download information may be transmitted to an LBA 820 of a terminal 800. The bundle download information may be at least one of a bundle management server address (SPBM Addr) of a bundle management server to which the LBA 820 is to access, a bundle delimiter of a prepared bundle, or a bundle family ID (SPBM Family ID) of the prepared bundle. The bundle delimiter may include at least one of a bundle Matching ID or a bundle Event ID. The bundle delimiter may include the bundle family ID of the prepared bundle.

The bundle event ID may include at least one of the bundle Matching ID or the address of the bundle management server. The bundle download information may be input by a subscriber 830 to the LBA 820 (e.g., QR code scanning or direct character inputting), or may be input to the LBA 820 via an information providing server (not shown) by using a push input. The LBA 820 may access the information providing server (not shown) previously set in the terminal 800 and may receive the bundle download information.

In operation 8002, the terminal 800 and a bundle management server 850 may perform a procedure of negotiating a certificate to select a certificate that may be used in mutual authentication and encryption between the terminal 800 and the bundle management server 850. The operation 8002 may correspond to an operations of FIG. 6.

In operation 8003, the LBA 820 may request an SSP 810 for SSP authentication information (SSP Credential). At this time, the LBA 820 may request the SSP 810 for SSP authentication information including the bundle Matching ID. The LBA 820 may selectively transmit, to the SSP 810, at least one of a bundle family ID (spbFamilyId) of a bundle to be additionally downloaded, a Key Agreement certificate (CERT.SPBM.ECKA) of the bundle management server 850, CI information (sspCiToBeUsed) to be used by an SSP, or a server challenge (spbmChallenge) of a bundle management server. When the bundle family ID (spbFamilyId) and the Key Agreement certificate (CERT.SPBM.ECKA) value of the bundle management server 850 are transmitted to the SSP 810, verified by the SSP 810, and stored in the SSP 810 in operation 8002, a corresponding input may be omitted. In operation 8003, the SSP 810 may compare the preset information (sspCiForSigning) about CIs having issued certificates for different bundle family IDs to an SSP and the preset information (sspCiForVerification) about bundle management server certificate issuing CIs trusted by the SSP with the Key Agreement certificate (CERT.SPBM.ECKA) of the bundle management server 850, the CI information to be used by the SSP, and the bundle family ID, to thereby verify whether a bundle is supportable. In operation 8003, the SSP 810 may store the bundle family ID and the CI information of a certificate for the verified bundle family ID.

In operation 8004, the SSP 810 may generate a session key (ShKey01) with the bundle management server 850. The SSP 810 may generate an SSP ephemeral public key (ePK.SSP.ECKA, and an SSP ephemeral secrete key (eSK.SSP.ECKA). The SSP 810 may extract a public key (PK.SPBM.ECKA) for Key Agreement from the Key Agreement certificate (CERT.SPBM.ECKA) of the bundle management server 850 transmitted in operation 8001, 8002, or 8003, and may generate the session key (ShKey01) via a key derivation function (KDF) by using the public key (PK.SPBM.ECKA) for Key Agreement of the bundle management server 850 and the SSP ephemeral secrete key (eSK.SSP.ECKA). In this case, the SSP 810 may use, as the KDF, a key generation function defined in BSI TR 03111, and the session key (ShKey01) may include 128 bits or 256 bits.

In operation 8005, the SSP 810 may generate SSP authentication information (SSP Credential). In operation 8005, the SSP 810 may generate SSPToken01 by encrypting an SSP certificate (CERT.SSP.ECDSA) existing on a hierarchy of a CI negotiated with the bundle management server 850 by using the session key (ShKey01) generated in operation 8004. The SSP 810 may also generate SSPToken01 by encrypting an SSP ID (SSP ID) together with the SSP certificate (CERT.SSP.ECDSA). At this time, the SSP 810 may perform the encryption via the GCM-AES128 or GCM-AES256 manner.

In operation 8005, the SSP 810 may also generate SSP-Token02 by including at least one of a Transaction ID and a bundle Matching ID both indicating a current session, or the SSP ephemeral public key (ePK.SSP.ECKA). In this case, the SSP 810 may generate SSPToken02 by selectively including the bundle management server challenge (spbmChallenge). The SSP 810 may generate SSPToken02 by including a digital signature of an SSP capable of verifying the integrity of information included in the SSP-Token02, in the SSP certificate (CERT.SSP.ECDSA) included in SSPToken01. SSPToken01 and SSPToken02 may be transmitted from the SSP 810 to the LBA 820.

In operation 8006, the terminal 800 may transmit the SSP authentication information (SSP Credential) to the bundle management server 850. In operation 8006, the LBA 820 and the bundle management server 850 may perform a TLS connection. The TLS connection in operation 8006 may use a server authentication method in which the LBA 820 identifies the bundle management server 850. In operation 8005, the terminal 800 may transmit SSPToken01 and SSPToken02 to the bundle management server 850. The terminal 800 may also transmit an SSP Maker certificate (CERT.SM.ECDSA) for the validity of an SSP certificate included in SSPToken01 to the bundle management server 850. When one or more Sub CI certificates are needed to verify the validity of the SSP Maker certificate (CERT.SM.ECDSA), the terminal 800 may submit the one or more Sub CI certificates together with the SSP Maker certificate to the bundle management server 850, in operation 8006.

In operation 8007, the bundle management server 850 may verify the SSP authentication information (SSP Credential). In operation 8007, the bundle management server 850 may generate the session key (ShKey01) via a KDF by using the SSP ephemeral public key (ePK.SSP.ECKA) included in SSPToken02 and the private key (SK.SPB.ECKA) for Key Agreement paired with the public key (PK.SPBM.ECKA) for Key Agreement within the Key Agreement certificate (CERT.SPBM.ECKA) of the bundle management server 850. In this case, the bundle management server 850 may use, as the KDF, a key generation function defined in BSI TR 03111, and the session key (ShKey01) may include 128 bits or 256 bits. In operation 8007, the bundle management server 850 may decrypt SSPToken01 by using the session key (ShKey01) to extract the SSP certificate (CERT.SSP.ECDSA). In operation 8007, the bundle management server 850 may verify the SSP certificate by using the SSP Maker certificate received from the LBA 820 in operation 8006. The bundle management server 850 may extract the SSP public key (PK.SSP.ECDSA) from the SSP certificate (CERT.SSP.ECDSA), and may verify the digital signature of the SSP included in SSPToken02.

In operation 8008, the bundle management server 850 may generate a session key that is to be used also by the SSP 810. The bundle management server 850 may generate an SPBM ephemeral public key (ePK.SPBM.ECKA) and an SPBM ephemeral secret key (eSK.SPBM.ECKA). The bundle management server 850 may generate a session key (ShKey02) via the KDF by using the SSP ephemeral public key (ePK.SSP.ECKA) and the SPBM ephemeral secrete key (eSK.SPBM.ECKA) verified in operation 8007. In this case, the bundle management server 850 may use, as the KDF, a key generation function defined in BSI TR 03111, and the session key (ShKey02) may include 128 bits or 256 bits.

In operation 8008, the bundle management server 850 may generate SPBMToken. SPBMToken generated by the bundle management server 850 may include at least one of the SPBM ephemeral public key (ePK.SPBM.ECKA) or a Transaction ID, and may include the digital signature of an SPBM capable of verifying the integrity of the information.

In operation 8008, the bundle management server 850 may generate a bound bundle by encrypting the entire or a portion of a bundle with the session key (ShKey02) such that the bundle may be decrypted only by the SSP 810.

In operation 8009, the bundle management server 850 may transmit the SPBMToken and the bound bundle to the LBA 820. In this case, the bundle management server 850 may transmit, to the LBA 820, the SPBMToken and the bound bundle by including the bundle management server certificate(CERT.SPBM.ECDSA) for verifying the digital signature of a bundle management server included in SPBMToken. When one or more Sub CI certificates are needed to verify the validity of the bundle management server certificate (CERT.SPBM.ECDSA), the bundle management server 850 may submit one or more Sub CI certificates together with the bundle management server certificate to the LBA 820, in operation 8009. The LBA 820 may transmit the information to the SSP 810 to request verification and bundle installation.

In operation 8010, the SSP 810 may verify SPBM Credential. In operation 8010, the SSP 810 may verify the bundle management server certificate (CERT.SPBM.ECDSA), and may verify the digital signature of the bundle management server included in SPBMToken by using the bundle management server public key (PK.SPBM.ECDSA) included in the corresponding certificate. The SSP 810 may also verify the validity of the SPBMToken by determining whether Transaction ID generated by the SSP 810 in operation 8005 is the same as Transaction ID included in the SPBMToken. The SSP 810 may generate the session key (ShKey02) via the KDF by using the SSP ephemeral secrete key (eSK.SSP.ECKA) and the bundle management server ephemeral public key (ePK.SPBM.ECDSA) included in the SPBMToken. In this case, the bundle management server 850 may use, as the KDF, a key generation function defined in BSI TR 03111, and the session key (ShKey02) may include 128 bits or 256 bits. In operation 8009, the SSP 810 may decrypt the bound bundle by using the session key (ShKey02) and may install a bundle in the SSP 810. In operation 8010, during the bundle installation, the bundle installation may be further checked by a user (End User, not shown) according to a setup value of at least one of the terminal 800, the SSP 810, or the LBA 820. In operation 8010, the SSP 810 may transmit a result of the bundle installation to the LBA 820.

In operation 8011, the SSP 810 may compare the bundle family ID stored in operation 8003 with a bundle family ID of the installed bundle, and, when the two bundle family IDs are identical with each other, may transmit an installation completion result to the LBA 820. When the two bundle family IDs are not identical with each other, the SSP 810 may delete the installed bundle or set a state of unavailability and may transmit a result to the LBA 820.

Figure 9:
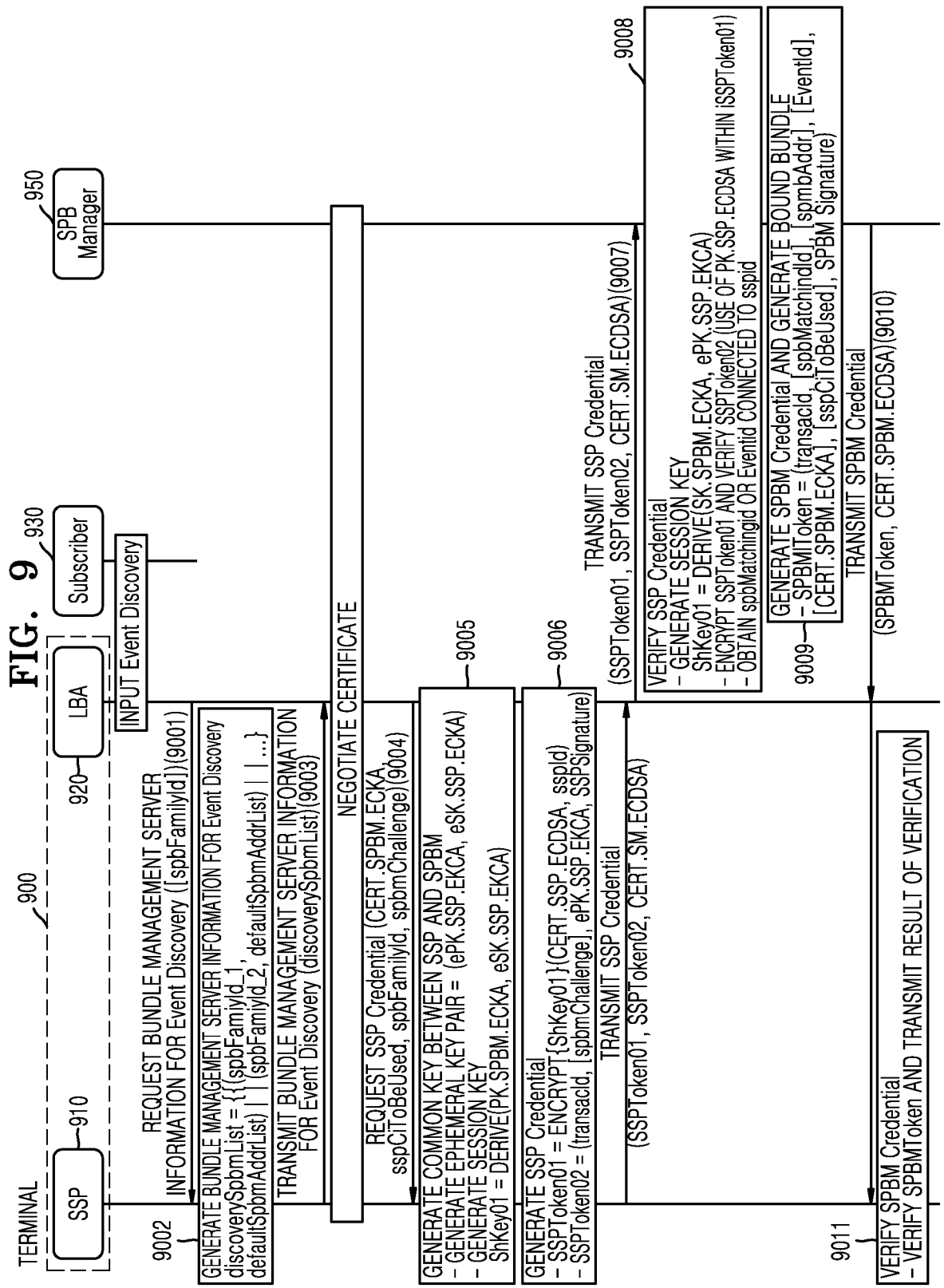
FIG. 9 illustrates a diagram of a procedure in which a terminal obtains bundle download information from a bundle management server, according to an embodiment of the disclosure.

FIG. 9 illustrates a diagram of a procedure in which a terminal obtains bundle download information from a bundle management server, according to an embodiment of the disclosure.

Referring to FIG. 9, an LBA 920 of a terminal 900 may start an operation of obtaining the bundle download information via a reservation operation or the like performed by a timer or the like within a subscriber 930, an external server (not shown), or the terminal 900.

In operation 9001, the LBA 920 may request an SSP 910 for information of a bundle management server capable of obtaining bundle download information. In operation 9001, the LBA 920 may transmit, to the SSP 910, a bundle family ID of a bundle to be downloaded. Although not shown in FIG. 9, basic bundle management server information (e.g., FQDN, an IP address, and a URL) capable of obtaining bundle download information for each bundle family ID may be pre-set in the SSP 910.

In operation 9002, the SSP 910 may extract basic bundle management server information capable of obtaining bundle download information for each bundle family ID. At this time, the SSP 910 may extract only basic bundle management server information for a bundle family ID received from the LBA 920 in operation 9001. When no bundle family IDs are transmitted, the SSP 910 may extract all information.

In operation 9003, the SSP 910 may transmit the bundle family ID and the basic bundle management server information for the bundle family ID to the LBA 920 by using the extracted information. The LBA 920 may store the received bundle family ID and the received basic bundle management server information, and may use them later during an operation of obtaining bundle download information.

The terminal 900 may perform a procedure of selecting one from among obtained or stored bundle family IDs and negotiating a certificate to select a certificate that may be used in mutual authentication and encryption with a bundle management server 950 connected to the selected bundle family ID. The procedure of negotiating a certificate may correspond to an operations of FIG. 6.

In operation 9004, the LBA 920 may request the SSP 910 for SSP authentication information (SSP Credential). At this time, the LBA 920 may selectively transmit, to the SSP 910, at least one of a bundle family ID (spbFamilyId) of a bundle to be downloaded, a Key Agreement certificate (CERT.SPBM.ECKA) of the bundle management server 950, CI information (sspCiToBeUsed) to be used by an SSP, or a server challenge (spbmChallenge) of a bundle management server. When the bundle family ID (spbFamilyId) and the Key Agreement certificate (CERT.SPBM.ECKA) of the bundle management server 950 are transmitted to the SSP 910, verified by the SSP 910, and stored in the SSP 910 in the operation of negotiating a certificate, a corresponding input may be omitted. In operation 9004, the SSP 910 may compare the preset information (sspCiForSigning) about CIs having issued certificates for different bundle family IDs to an SSP and the preset information (sspCiForVerification) about bundle management server certificate issuing CIs trusted by the SSP with the Key Agreement certificate (CERT.SPBM.ECKA) of the bundle management server 950, the CI information to be used by the SSP, and the bundle family ID, to thereby verify whether a bundle is supportable. In operation 9004, the SSP 910 may store the bundle family ID and the CI information of a certificate with respect to a verified bundle family ID.

In operation 9005, the SSP 910 may generate a session key (ShKey01) with the bundle management server 950. The SSP 910 may generate an SSP ephemeral public key (ePK.SSP.ECKA) and an SSP ephemeral secrete key (eSK.SSP.ECKA). The SSP 910 may extract a public key (PK.SPBM.ECKA) for Key Agreement from a Key Agreement certificate (CERT.SPBM.ECKA) of the bundle management server 950, and may generate the session key (ShKey01) via a KDF by using the public key (PK- .SPBM.ECKA) for Key Agreement of the bundle management server 950 and the SSP ephemeral secrete key (eSK.SSP.ECKA). In this case, the SSP 910 may use, as the KDF, a key generation function defined in BSI TR 03111, and the session key (ShKey01) may include 128 bits or 256 bits.

In operation 9006, the SSP 910 may generate SSP authentication information (SSP Credential). In operation 9006, the SSP 910 may generate SSPToken01 by encrypting an SSP certificate (CERT.SSP.ECDSA) existing on a hierarchy of a CI negotiated with the bundle management server 950 by using the session key (ShKey01). The SSP 910 also generate SSPToken01 by encrypting the SSP certificate (CERT.SSP.ECDSA) together with an SSP ID (SSP ID). At this time, the SSP 910 may perform the encryption via the GCM-AES128 or GCM-AES256 manner.

In operation 9006, the SSP 910 may also generate SSPToken02 by including at least one of a Transaction ID and a bundle Matching ID both indicating a current session, or the SSP ephemeral public key (ePK.SSP.ECKA). In this case, the SSP 910 may generate SSPToken02 by selectively including the bundle management server challenge (spbmChallenge). The SSP 910 may generate SSPToken02 by including a digital signature of an SSP capable of verifying the integrity of information included in the SSPToken02, in the SSP certificate (CERT.SSP.ECDSA) included in SSPToken01. SSPToken01 and SSPToken02 may be transmitted from the SSP 910 to the LBA 920.

In operation 9007, the terminal 900 may transmit the SSP authentication information (SSP Credential) to the bundle management server 950. In operation 9007, the LBA 920 and the bundle management server 950 may perform a TLS connection. The TLS connection in operation 9007 may use a server authentication method in which the LBA 920 identifies the bundle management server 950. In operation 9007, the terminal 900 may transmit SSPToken01 and SSPToken02 to the bundle management server 950. The terminal 900 may also transmit an SSP Maker certificate (CERT.SM.ECDSA) for the validity of an SSP certificate included in SSPToken01 to the bundle management server 950. When one or more Sub CI certificates are needed to verify the validity of the SSP Maker certificate (CERT.SM.ECDSA), the terminal 900 may submit the one or more Sub CI certificates together with the SSP Maker certificate to the bundle management server 950, in operation 9007.

In operation 9008, the bundle management server 950 may verify the SSP authentication information (SSP Credential). In operation 9008, the bundle management server 950 may generate the session key (ShKey01) via a KDF by using the SSP ephemeral public key (ePK.SSP.ECKA) included in SSPToken02 and the private key (SK.SPB.ECKA) for Key Agreement paired with the public key (PK.SPBM.ECKA) for Key Agreement within the Key Agreement certificate (CERT.SPBM.ECKA) of the bundle management server 950. In this case, the bundle management server 950 may use, as the KDF, a key generation function defined in BSI TR 03111, and the session key (ShKey01) may include 128 bits or 256 bits. In operation 9008, the bundle management server 950 may decrypt SSPToken01 by using the session key (ShKey01) to extract the SSP certificate (CERT.SSP.ECDSA). In operation 9008, the bundle management server 950 may verify the SSP certificate by using the SSP Maker certificate received from the LBA 920 in operation 9007. The bundle management server 950 may extract the SSP public key (PK.SSP.ECDSA) from the SSP certificate (CERT.SSP.ECDSA), and may verify the digital signature of the SSP included in SSPToken02.

In operation 9008, the bundle management server 950 may also extract a bundle delimiter connected to the SSP ID (sspId). The bundle delimiter may include at least one of a bundle Matching ID or a bundle Event ID. The bundle delimiter may include the bundle family ID of the prepared bundle. The bundle event ID may include at least one of the bundle Matching ID or the address of the bundle management server.

In operation 9009, the bundle management server 950 may generate SPBMToken. SPBMToken generated by the bundle management server 950 may include at least one of the bundle delimiter or a Transaction ID, and may include the digital signature of an SPBM capable of verifying the integrity of the information. The bundle delimiter may include at least one of a bundle Matching ID or a bundle Event ID. The bundle delimiter may include the bundle family ID of the prepared bundle. The bundle event ID may include at least one of the bundle Matching ID or the address of the bundle management server. SPBMToken generated by the bundle management server 950 may include a bundle management server address. In this case, the bundle management server address may be information of a server to be visited by the LBA 920 to obtain a bundle ID.

In operation 9010, the bundle management server 950 may transmit the SPBMTokento the LBA 920. In this case, the bundle management server 950 may transmit, to the LBA 820, the bundle management server certificate (CERT.SPBM.ECDSA) for verifying the digital signature of a bundle management server included in SPBMToken. When one or more Sub CI certificates are needed to verify the validity of the bundle management server certificate (CERT.SPBM.ECDSA), the bundle management server 950 may submit one or more Sub CI certificates together with the bundle management server certificate to the LBA 920, in operation 9010. The LBA 920 may transmit the information to the SSP 910 to request verification and bundle installation.

In operation 9011, the SSP 910 may verify SPBM Credential. In operation 9011, the SSP 910 may verify the bundle management server certificate (CERT.SPBM.ECDSA), and may verify the digital signature of the bundle management server included in SPBMToken by using the bundle management server public key (PK.SPBM.ECDSA) included in the corresponding certificate. The SSP 910 may also verify the validity of the SPBMToken by determining whether Transaction ID generated by the SSP 910 in operation 9006 is the same as Transaction ID included in the SPBMToken, and may transmit a result of the verification to the LBA 920.

When the verified bundle ID includes the bundle Matching ID and selectively includes the bundle management server information, the LBA 920 may perform a process of downloading and installing a bundle via a bundle management server by using the corresponding information. When the verified bundle ID includes the bundle Event ID and selectively includes the bundle management server address, the LBA 920 may perform a process of obtaining bundle download information by using the corresponding ID.

Figure 10:
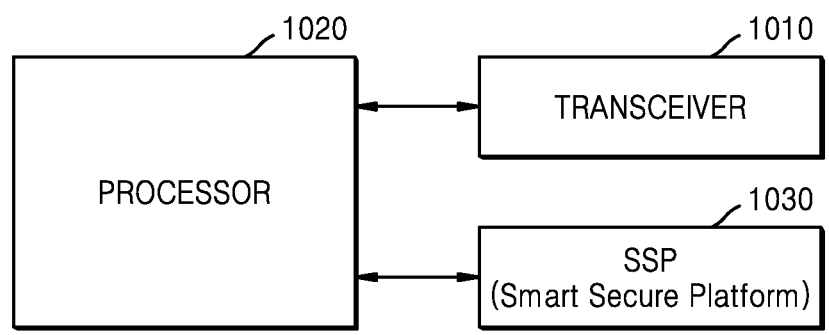
FIG. 10 illustrates a block diagram of a structure of a terminal according to an embodiment of the disclosure.

FIG. 10 illustrates a block diagram of a structure of a terminal according to an embodiment of the disclosure.

Referring to FIG. 10, the terminal may include a transceiver 1010 and at least one processor 1020. The terminal may also include an SSP 1030. For example, the SSP 1030 may be inserted into the terminal or may be embedded in the terminal. The at least one processor 1020 may be referred to as a controller.

However, the structure of the terminal is not limited to FIG. 10, and the terminal may include more or less components than the components illustrated in FIG. 10. According to an embodiment of the disclosure, the transceiver 1010, the at least one processor 1020, and a memory (not shown) may be implemented in the form of a single chip. When the SSP 1030 is embedded in the terminal, the transceiver 1010, the at least one processor 1020, the memory (not shown), and the SSP 1030 may be implemented in the form of a single chip. According to an embodiment of the disclosure, the transceiver 1010 may transmit and receive signals, information, and data according to various embodiments of the disclosure to and from a bundle management server. The transceiver 1010 may include an RF transmitter that up-converts and amplifies the frequency of a signal to be transmitted, and an RF receiver that low-noise-amplifies a received signal and down-converts the frequency of the received signal. However, this is only an embodiment of the transceiver 1010, and the components of the transceiver 1010 are not limited thereto. The transceiver 1010 may receive a signal and output the signal through a wireless channel, and may transmit the signal output by the at least one processor 1020 through a wireless channel.

According to an embodiment of the disclosure, the transceiver 1010 may receive the certificate of a bundle management server, CI information to be used by the SSP 1030, a bundle family ID, a bound bundle, and the like from the bundle management server. The transceiver 1010 may transmit CI information corresponding to a specific bundle family ID, authentication information of the SSP 1030, and the like to the bundle management server.

The at least one processor 1020 may entirely control the terminal. The at least one processor 1020 may control an overall operation of the terminal, according to various embodiments of the disclosure as described above.

According to an embodiment of the disclosure, the at least one processor 1020 may control the transceiver 1010 to transmit the CI information corresponding to the specific bundle family ID to the bundle management server, and receive at least one of the certificate of the bundle management server, CI information to be used by the SSP, or a bundle family ID from the bundle management server.

The SSP 1030 according to various embodiments of the disclosure may download a bundle and may install the bundle. The SSP 1030 may manage the bundle.

According to an embodiment of the disclosure, the SSP 1030 may operate under the control of the at least one processor 1020.

According to an embodiment of the disclosure, the SSP 1030 may include a processor or a controller for installing and controlling the profile, or an application may be installed in the SSP 1030. A part or the whole of the application may be installed in the SSP 1030 or the memory (not shown).

According to an embodiment of the disclosure, at least one processor or controller within the SSP 1030 may check CI information that may be used when downloading and installing a specific bundle corresponding to a specific bundle family ID, and may verify at least one of a bundle management server certificate transmitted based on CI information for each bundle family ID set in the SSP 1030, CI information to be used by the SSP 1030, or a bundle family ID.

The terminal may further include the memory (not shown), and may store data such as a basic program, an application program, or setup information for an operation of the terminal. The memory may include at least one type of storage medium from among a flash memory type, a hard disk type, a multimedia card micro type, a card type memory (for example, a secure digital (SD) or extreme digital (XD) memory), a magnetic memory, a magnetic disk, an optical disk, a random access memory (RAM), a static random access memory (SRAM), a read-only memory (ROM), a programmable ROM (PROM), and an electrically erasable programmable ROM (EEPROM). The at least one processor 1020 may perform various operations by using various programs, content, data, etc. stored in the memory.

Figure 11:
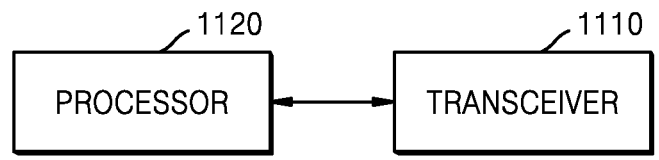
FIG. 11 illustrates a block diagram of a structure of a bundle management server according to an embodiment of the disclosure.

FIG. 11 illustrates a block diagram of a structure of a bundle management server according to an embodiment of the disclosure.

According to an embodiment of the disclosure, the bundle management server may include a transceiver 1110 and at least one processor 1120. However, the structure of the bundle management server is not limited to FIG. 11, and the bundle management server may include more or less components than the components illustrated in FIG. 11. According to an embodiment of the disclosure, the transceiver 1110, the at least one processor 1120, and a memory (not shown) may be implemented in the form of a single chip.

According to an embodiment of the disclosure, the transceiver 1110 may transmit and receive signals, information, and data according to various embodiments of the disclosure to and from a terminal, a subscriber, or a service provider. For example, the transceiver 1110 may receive CI information corresponding to a specific bundle family ID, authentication information of an SSP, and the like from the terminal, and transmit the certificate of a bundle management server, CI information to be used by the SSP, a bundle family ID, a bound bundle, and the like to the terminal.

The transceiver 1110 may include an RF transmitter that up-converts and amplifies the frequency of a signal to be transmitted, and an RF receiver that low-noise-amplifies a received signal and down-converts the frequency of the received signal. However, this is only an embodiment of the transceiver 1110, and the components of the transceiver 1110 are not limited to the RF transmitter and the RF receiver. The transceiver 1110 may receive a signal and output the signal through a wireless channel, and may transmit the signal output by the at least one processor 1120 through a wireless channel.

The at least one processor 1120 may entirely control the bundle management server. The at least one processor 1120 may control an overall operation of the bundle management server, according to various embodiments of the disclosure as described above. The at least one processor 1120 may be referred to as a controller.

According to an embodiment of the disclosure, the at least one processor 1120 may select a certificate of the bundle management server to be transmitted to the terminal and CI information to be used by an SSP of the terminal, verify authentication information (SSP Credential) of the SSP of the terminal, and generate SPBMToken and a bound bundle.

According to an embodiment of the disclosure, the at least one processor 1120 may control the transceiver 1110 to transmit the certificate of the bundle management server, the CI information to be used by the SSP, a bundle family ID, the bound bundle, and the like to the terminal and receive the CI information corresponding to the specific bundle family ID, the authentication information of the SSP, and the like from the terminal.

The bundle management server may further include the memory (not shown), and may store data such as a basic program, an application program, or setup information for an operation of the bundle management server. The memory may include at least one type of storage medium from among a flash memory type, a hard disk type, a multimedia card micro type, a card type memory (for example, a secure digital (SD) or extreme digital (XD) memory), a magnetic memory, a magnetic disk, an optical disk, a random access memory (RAM), a static random access memory (SRAM), a read-only memory (ROM), a programmable ROM (PROM), and an electrically erasable programmable ROM (EEPROM). The at least one processor 1120 may perform various operations by using various programs, content, data, etc. stored in the memory.

In the above-described embodiments of the disclosure, the elements included in the disclosure are expressed in a singular or plural form according to the proposed specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

According to various embodiments of the disclosure, a terminal may notify a bundle management server of CI information set for a specific bundle family ID in an SSP, and a bundle management server may select a digital certificate and a CI which are to be used to download and install a bundle having a corresponding bundle family ID by referring to this value.

Although various embodiments of the disclosure have been described in detail herein above, it should be understood that many variations and modifications may be made without departing from the spirit and scope of the disclosure as defined in the appended claims and their equivalents. Therefore, the scope of the disclosure is defined not by the detailed description of examples but by the appended claims and equivalents to the appended claims.

Embodiments and terms used therein are not intended to limit the disclosure to particular modes of practice, and it is to be appreciated that all modifications, equivalents, and/or alternatives that do not depart from the spirit and technical scope are encompassed in the disclosure. Throughout the specification and drawings, like reference numerals denote the same elements. An expression used in the singular may encompass the expression of the plural, unless it has a clearly different meaning in the context. In the disclosure, the terms "A or B," "at least one of A and/or B", "A, B, or C", and "at least one of A, B, and/or C" may include any one of listed items and all of at least one combination of the items. Expressions such as "first" "second" "primarily," and "secondary," may represent various elements regardless of order and/or importance, and do not limit corresponding elements. These expressions may be used for distinguishing one element from another element. When an element (e.g., a first element) is referred to as being "(operatively or communicatively) coupled to/with" or "connected to/with" another element (e.g., a second element), it may be coupled to/with or connected to/with the other element directly or indirectly through another element (e.g., a third element).

The term "module", as used herein, may include a unit including hardware, software, or firmware. For example, the term "module" may be interchangeably used with the term a "logic", a "logical block", a "component", or a "circuit". The "module" may be an integrally formed component, a minimum unit performing one or more functions, or a part of the minimum unit. For example, the "module" may include an application-specific integrated circuit (ASIC).

Various embodiments of the disclosure may be implemented as software (e.g., a program) including one or more instructions that are stored in a machine (e.g., a computer)-readable storage medium (e.g., an internal memory or an external memory). The machine that is a device for calling instructions stored in the storage medium and operating according to the called instructions may include a terminal (e.g., the terminal 110) according to various embodiments of the disclosure. When a command is executed by a processor (e.g., the processor 1020 of FIG. 10 or the processor 1120 of FIG. 11), the processor may perform a function corresponding to the command directly or by using other elements under the control of the processor. The command may include code generated or executed by a compiler or an interpreter.

The machine-readable storage medium may be provided as a non-transitory storage medium. Here, 'non-transitory' means that the storage medium does not include a signal and is tangible, but does not include distinguish whether data is stored semi-permanently or temporarily in the storage medium.

A method according to various embodiments of the disclosure may be included and provided in a computer program product. The computer program product may be traded as a commodity between a seller and a purchaser. The computer program product may be distributed in the form of a machine-readable storage medium (e.g., compact disc read only memory (CD-ROM)), or be distributed online via an application store (e.g., Play Store™). When distributed online, at least part of the computer program product may be temporarily generated or at least temporarily stored in a storage medium, such as a memory of a manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described sub-components may be omitted, or one or more other sub-components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration According to various embodiments of the disclosure, operations performed by modules, programs, or other components may be executed in a sequential, parallel, iterative, or heuristic manner. Also, at least some of the operations may be performed in a different order or may not be performed, or another operation may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a local bundle assistant (LBA) negotiating a certificate with a secondary platform bundle manager (SPBM) in a wireless communication system, the method comprising:

delivering, to a secondary platform bundle loader (SPBL) of a secondary secure platform (SSP), a request message;

obtaining, from the SPBL, a response message including information, wherein the information includes family identifier associated with secondary platform bundle, information associated with SPBM certificate, and information associated with SPBL certificate, the information associated with SPBM certificate being used for SPBL to verify the SPBM certificate and the information associated with SPBL certificate being used for SPBM to verify the SPBL certificate, as a response to the request message;

establishing a transport layer security (TLS) connection with the SPBM;

transmitting the information to the SPBM; and receiving, from the SPBM, the SPBM certificate identified based on the information associated with SPBM certificate, information related to SPBL certificate to be used by the SPBL identified based on the information associated with SPBL certificate, and the family identifier.

2. The method of claim 1, wherein the request message includes the family identifier.

3. The method of claim 1, wherein the information further includes information of a release of a specification implemented by the SPBL.

4. The method of claim 1, wherein the TLS connection uses a server authentication mode.

5. The method of claim 1, wherein the SPBM certificate is verifiable by a public key indicated by one of public key identifiers included in the information associated with SPBM certificate, and is determined at the SPBM.

6. The method of claim 1, wherein:
one of public key identifiers included in the information associated with SPBL certificate is identified by the SPBM; and
the information related to SPBL certificate to be used by the SPBL is set at the SPBM as the identified one of public key identifiers.

7. The method of claim 1, further comprising:
receiving, from the SPBM, sub certificates of the SPBM certificate.

8. A method of a secondary platform bundle manager (SPBM) negotiating a certificate with a local bundle assistant (LBA) in a wireless communication system, the method comprising:

receiving, from the LBA, information including family identifier associated with secondary platform bundle, information associated with SPBM certificate, and information associated with secondary platform bundle loader (SPBL) certificate, the information associated with SPBM certificate being used for SPBL to verify the SPBM certificate and the information associated with SPBL certificate being used for SPBM to verify the SPBL certificate; and transmitting, to the LBA, the SPBM certificate identified based on the information associated with SPBM certificate, information related to SPBL certificate to be used by the SPBL identified based on the information associated with SPBL certificate, and the family identifier.

9. The method of claim 8, wherein the information further includes information of a release of a specification implemented by the SPBL.

10. The method of claim 8, further comprising:
establishing a transport layer security (TLS) connection with the LBA in server authentication mode.

11. The method of claim 8, further comprising:
determining the SPBM certificate, that is verifiable by a public key indicated by one of public key identifiers included in the information associated with SPBM certificate.

12. The method of claim 8, further comprising:
identifying one of public key identifiers included in the information associated with SPBL certificate, and
setting the information related to SPBL certificate to be used by the SPBL as the identified one of public key identifiers.

13. The method of claim 8, further comprising:
transmitting, to the LBA, sub certificates of the SPBM certificate.

14. A local bundle assistant (LBA) negotiating a certificate with a secondary platform bundle manager (SPBM) in a wireless communication system, the LBA comprising:
a transceiver; and
at least one controller coupled with the transceiver, the at least one controller configured to:
deliver, to a secondary platform bundle loader (SPBL) of a secondary secure platform (SSP), a request message;
obtain, from the SPBL, a response message including information, wherein the information includes family identifier associated with secondary platform bundle, information associated with SPBM certificate, and information associated with SPBL certificate, the information associated with SPBM certificate being used for SPBL to verify the SPBM certificate and the information associated with SPBL certificate being used for SPBM to verify the SPBL certificate, as a response to the request message;
establish a transport layer security (TLS) connection with the SPBM;
transmit the information to the SPBM; and
receive, from the SPBM, the SPBM certificate identified based on the information associated with SPBM certificate, information related to SPBL certificate to be used by the SPBL identified based on the information associated with SPBL certificate, and the family identifier.

15. The LBA of claim 14, wherein the request message includes the family identifier.

16. The LBA of claim 14, wherein the SPBM certificate is verifiable by a public key indicated by one of public key identifiers included in the information associated with SPBM certificate, and is determined at the SPBM.

17. The LBA of claim 14, wherein:
one of public key identifiers included in the information associated with SPBL certificate is identified by the SPBM; and
the information related to SPBL certificate to be used by the SPBL is set at the SPBM as the identified one of public key identifiers.

18. A secondary platform bundle manager (SPBM) negotiating a certificate with a local bundle assistant (LBA) in a wireless communication system, the SPBM comprising:
a transceiver; and
at least one controller coupled with the transceiver, the at least one controller configured to:
receive, from the LBA, information including family identifier associated with secondary platform bundle, information associated with SPBM certificate, and information associated with secondary platform bundle loader (SPBL) certificate, the information associated with SPBM certificate being used for SPBL to verify the SPBM certificate and the information associated with SPBL certificate being used for SPBM to verify the SPBL certificate; and transmit, to the LBA, the SPBM certificate identified based on the information associated with SPBM certificate, information related to SPBL certificate to be used by the SPBL identified based on the information associated with SPBL certificate, and the family identifier.

19. The SPBM of claim 18, wherein the at least one controller is configured to:

determine the SPBM certificate, that is verifiable by a public key indicated by one of public key identifiers included in the information associated with SPBM certificate.

20. The SPBM of claim 18, wherein the at least one controller is configured to:

identify one of public key identifiers included in the information associated with SPBL certificate, and set the information related to SPBL certificate to be used by the SPBL as the identified one of public key identifiers.

* * * * *